(12) United States Patent
Akselrod et al.

(10) Patent No.: US 11,355,858 B2
(45) Date of Patent: *Jun. 7, 2022

(54) TUNABLE LIQUID CRYSTAL METASURFACES

(71) Applicant: Lumotive, LLC, Bellevue, WA (US)

(72) Inventors: Gleb M. Akselrod, Bellevue, WA (US); Yuanmu Yang, Chongqing (CN); Patrick Bowen, Durham, NC (US)

(73) Assignee: Lumotive, LLC, Redmond, WA (US)

( * ) Notice: Subject to any disclaimer, the term of this patent is extended or adjusted under 35 U.S.C. 154(b) by 242 days.

This patent is subject to a terminal disclaimer.

(21) Appl. No.: 16/882,662

(22) Filed: May 25, 2020

(65) Prior Publication Data

US 2020/0303827 A1 Sep. 24, 2020

Related U.S. Application Data

(60) Division of application No. 16/505,687, filed on Jul. 8, 2019, now Pat. No. 10,665,953, which is a
(Continued)

(51) Int. Cl.
*H01Q 15/00* (2006.01)
*G01S 17/02* (2020.01)
(Continued)

(52) U.S. Cl.
CPC ......... *H01Q 15/0066* (2013.01); *G01S 7/484* (2013.01); *G01S 7/486* (2013.01); *G01S 17/02* (2013.01); *H01Q 3/22* (2013.01)

(58) Field of Classification Search
CPC ...... H01Q 15/0066; H01Q 3/22; G01S 7/484; G01S 7/486; G01S 17/02; G01S 7/481;
(Continued)

(56) References Cited

U.S. PATENT DOCUMENTS 6,844,946 B2 1/2005 Buse
9,476,981 B2 10/2016 Yaacobi
(Continued)

FOREIGN PATENT DOCUMENTS

WO WO 2018/156643 8/2018
WO WO 2018/156688 8/2018
(Continued)

OTHER PUBLICATIONS

Lumotive, LLC, International Patent Application No. PCT/US20/22599, International Search Report and Written Opinion dated Jul. 23, 2020, 12 pp.
(Continued)

*Primary Examiner* — James C. Jones
(74) *Attorney, Agent, or Firm* — Phillips Winchester; Justin K. Flanagan

(57) ABSTRACT

A tunable, optical metasurface can include an optically reflective surface to reflect optical radiation, such as infrared laser light. An array of optical resonant antennas may, for example, extend from or otherwise be positioned on the reflective surface with sub-wavelength spacings of, for example, less than one-half of a wavelength. Voltage-controlled liquid crystal may be positioned in the optical field region of each of the optical resonant antennas. A controller may apply a voltage differential bias pattern to the liquid crystal of optical resonant antennas, that may be arranged in tiled, interleaved, or randomly arranged subsets of optical resonant antennas to attain one-dimensional beam steering, two-dimensional beam steering, and/or spatial beam shaping.

20 Claims, 21 Drawing Sheets

Related U.S. Application Data continuation of application No. 16/357,288, filed on Mar. 18, 2019.

(51) Int. Cl.
  *G01S 7/484* (2006.01)
  *G01S 7/486* (2020.01)
  *H01Q 3/22* (2006.01)

(58) Field of Classification Search
  CPC ... G02F 1/1313; G02F 1/133553; G02F 1/292
  See application file for complete search history.

(56) References Cited

U.S. PATENT DOCUMENTS

| | | | |
|---|---|---|---|
| 9,946,076 | B2 | 4/2018 | Smits |
| 10,199,415 | B2 | 2/2019 | Akselrod |
| 10,332,923 | B2 | 6/2019 | Josberger |
| 10,720,712 | B2 | 7/2020 | Foo |
| 10,816,939 | B1 | 10/2020 | Coleman |
| 11,005,186 | B2 * | 5/2021 | Akselrod ........... H01Q 15/0066 |
| 2012/0194399 | A1 | 8/2012 | Bily et al. |
| 2014/0266946 | A1 | 9/2014 | Bily et al. |
| 2015/0162658 | A1 | 6/2015 | Bowers et al. |
| 2015/0318618 | A1 | 11/2015 | Chen et al. |
| 2015/0318620 | A1 | 11/2015 | Black et al. |
| 2015/0372389 | A1 | 12/2015 | Chen et al. |
| 2015/0380828 | A1 | 12/2015 | Black et al. |
| 2017/0030773 | A1 | 2/2017 | Han et al. |
| 2018/0076521 | A1 | 3/2018 | Mehdipour et al. |
| 2018/0239021 | A1 | 8/2018 | Akselrod |
| 2018/0239213 | A1 | 8/2018 | Akselrod |
| 2018/0241131 | A1 | 8/2018 | Akselrod |
| 2018/0248267 | A1 | 8/2018 | Akselrod |
| 2019/0006533 | A1 | 1/2019 | Goldan et al. |
| 2019/0252441 | A1 | 8/2019 | Akselrod |
| 2019/0260124 | A1 | 8/2019 | Davoyan |

FOREIGN PATENT DOCUMENTS

| | | |
|---|---|---|
| WO | WO 2018/156793 | 8/2018 |
| WO | 2018/210776 A1 | 11/2018 |
| WO | 2019191778 A1 | 10/2019 |
| WO | 2021167657 A2 | 8/2021 |

OTHER PUBLICATIONS

U.S. Appl. No. 17/098,213, Non-Final Office Action dated Jan. 25, 2021, pp. 1-19.

"Unique" Definition, Meriam-Webster, downloaded Jan. 15, 2021 from https://www.merriam-webster.com/dictionary/unique, 9 pages (Year:2021).

Arbabi, et al., Dielectric Metasurfaces for Complete Control of Phase and Polarization with Subwavelength Spatial Resolution and High Transmission, arXiv:1411.1494v2 [physics.optics], Sep. 4, 2015, pp. 1-27.

Derickson et al., Self-Mode Locking of a Semiconductor Laser Using Positive Feedback, Feb. 1990, Applied Physics Letters, https://www.researchgate. net/publication/224422317_Self-Mode-Locking_of_a_Semiconductor_Laser_Using_Positive_Feedback>, pp. 7-9.

Lumotive, International Patent Application No. PCT/US20/60601, International Search Report and Written Opinion dated Sep. 9, 2021, 9 pp.

* cited by examiner

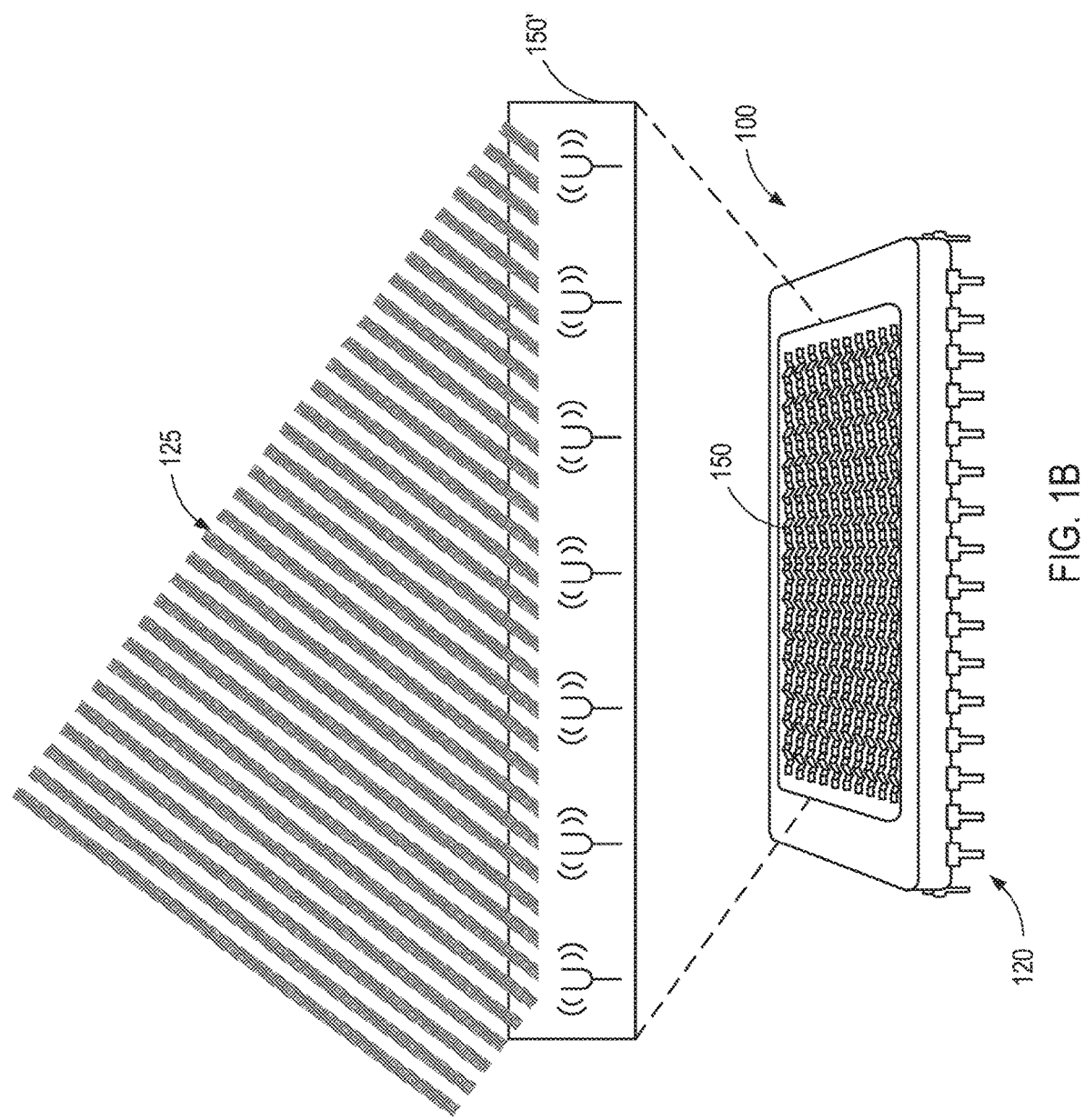

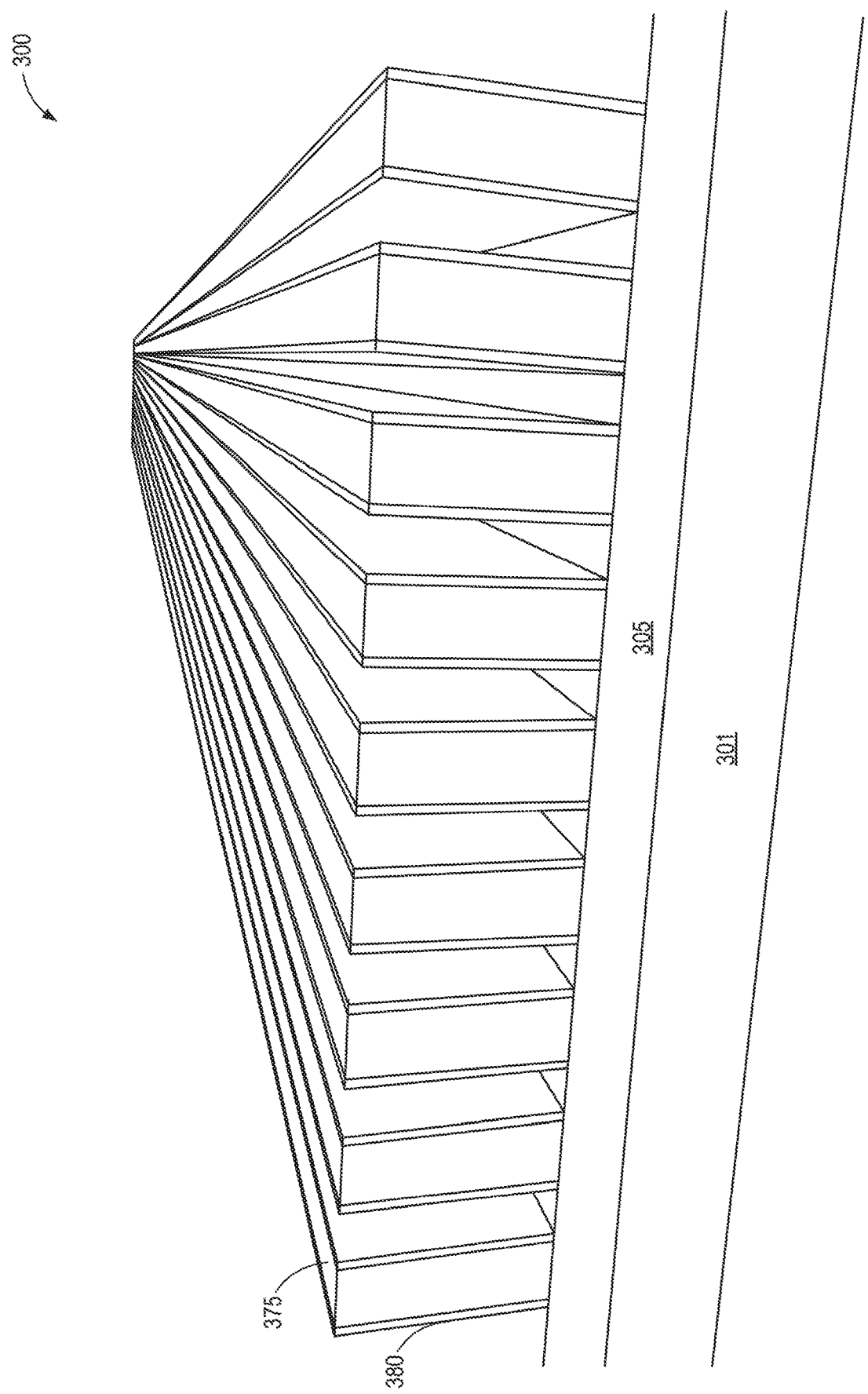

TUNABLE LIQUID CRYSTAL METASURFACES

RELATED APPLICATIONS

This application is a divisional of U.S. patent application Ser. No. 16/505,687 filed on Jul. 8, 2019, titled "Tunable Liquid Crystal Metasurfaces," which is a continuation of U.S. patent application Ser. No. 16/357,288 filed on Mar. 18, 2019, titled "Tunable Liquid Crystal Metasurfaces," which applications are hereby incorporated by reference in their entireties.

TECHNICAL FIELD

This disclosure relates to optical resonators and antennas. Specifically, this disclosure relates to tunable metasurfaces.

BRIEF DESCRIPTION OF THE DRAWINGS

FIG. 1B illustrates optical radiation incident on the metasurface of FIG. 1A at an angle of incidence.

FIG. 3 illustrates an example of an optically reflective surface with liquid-crystal-covered metal rails extending therefrom, according to one embodiment.

DETAILED DESCRIPTION

Figure 1A:
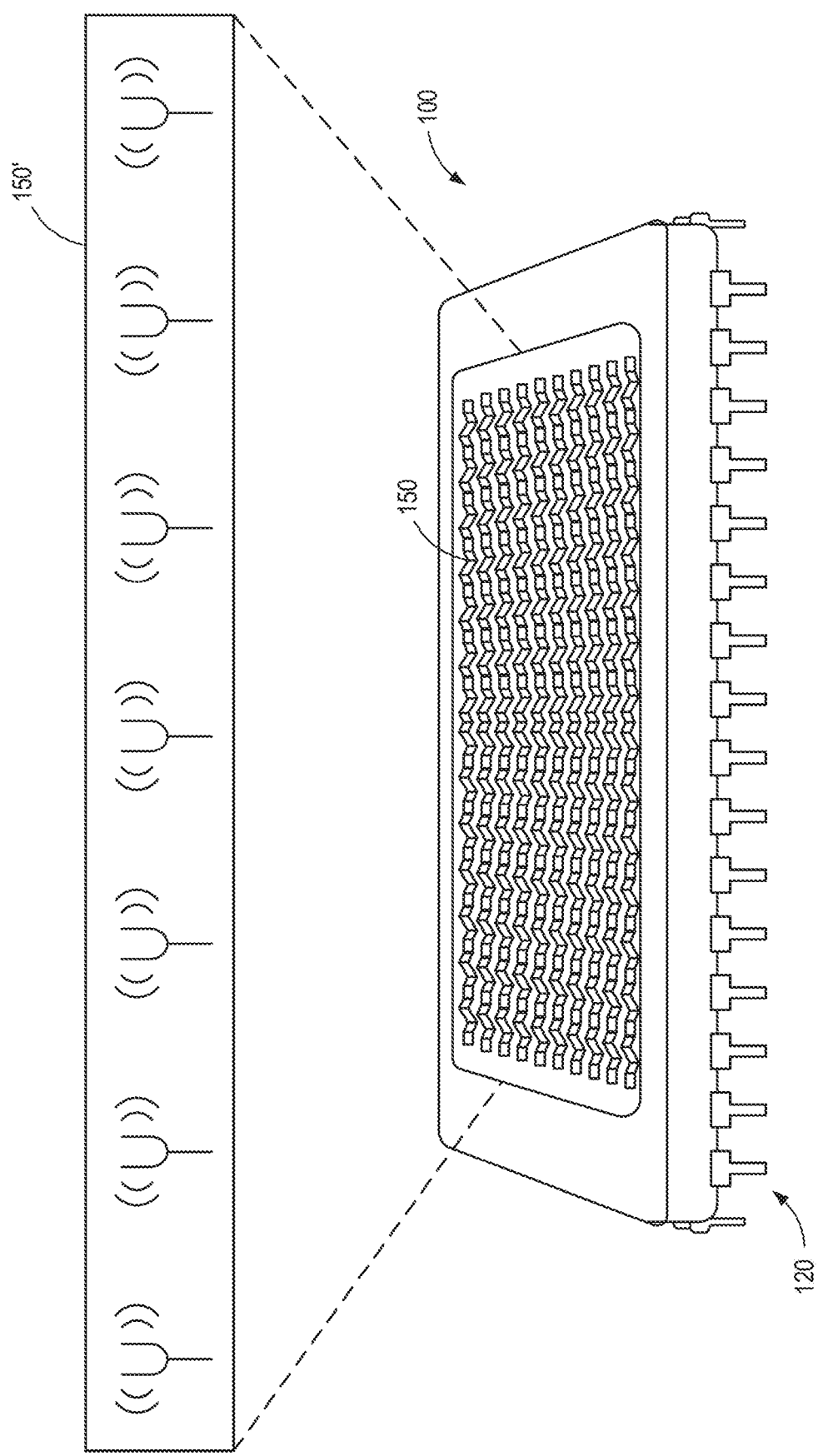
FIG. 1A illustrates a representation of a tunable, optical metasurface, according to one embodiment.

Tunable optical metasurfaces may be used for beamforming, including three-dimensional beam shaping, two-dimensional beam steering, or one-dimensional beam steering. In various embodiments, tunable optical metasurfaces may include optically reflective surfaces. An optically reflective surface may be a metal surface selected to reflect optical radiation within a specific bandwidth. A large number of optical resonant antennas may be positioned on the reflective surface. The optical resonant antennas may have sub-wavelength features and be arranged with sub-wavelength spacing. For example, the individual optical resonant antennas and the spacings therebetween may be less than one-half of a wavelength.

Liquid crystal may be positioned around the optical resonant antennas, as a layer on top of the optical resonant antennas, and/or as part of the optical resonant antennas. A digital or analog controller may selectively apply varying voltage differentials across the liquid crystal within optical field regions of each of the optical resonant antennas. The voltage controller may apply a voltage differential bias pattern, such as a blazed grating pattern, to the metasurface to attain a target beam steering angle.

A one-dimensional voltage bias pattern may be applied to liquid crystal within the optical field regions of a one-dimensional array of optical resonant antennas to effectuate one-dimensional beam steering. A two-dimensional voltage bias pattern may be applied to liquid crystal within the optical field regions of a two-dimensional array of optical resonant antennas to effectuate two-dimensional beam steering and/or spatial beamforming. One-dimensional beam steering, two-dimensional beam steering, and spatial beamforming are generally referred to herein as being encompassed by the term "beamforming."

The metasurface may have a default reflection angle or reflection pattern based on the reflective properties of the optically reflective surface, the unbiased optical resonant antennas, and the unbiased liquid crystal. In various embodiments, biasing the liquid crystal changes the reflection phase of the optical radiation proximate the associated optical resonant antennas. Each different voltage pattern across the metasurface corresponds to a different reflection phase pattern. With a one-dimensional array of optical resonant antennas, each different reflection phase pattern corresponds to a different steering angle in a single dimension. With a two-dimensional array of optical resonant antennas, each different reflection phase pattern may correspond to a different two-dimensional beam steering angle. Alternatively, each different reflection pattern may be used to effectuate a unique spatial beam form.

A wide variety of shapes, sizes, materials, configurations, and the like may be utilized. Optical resonant antennas may, for example, be formed as metal rails extending from the optically reflective surface. In some embodiments, a deposit of liquid crystal may fill part of each channel between adjacent optical resonant antennas. In other embodiments, the liquid crystal may be formed as a layer on top of the optical resonant antennas that fills the channels therebetween.

The voltage controller may apply a voltage pattern to the metal rails to bias the liquid crystal associated therewith to attain a target reflection phase pattern. In embodiments in which the optically reflective surface is metal and the optical resonant antennas are metal, a dielectric or another insulator may separate the metal surface and the optical resonant antennas. The voltage controller may be connected to the metal rails via contacts around a perimeter of the metasurface or via insulated thru-bores in the metal surface.

Copper is an example of a metal suitable and cost-effective for infrared bandwidths commonly used for light detection and ranging, or LiDAR, such as 905-nanometer LiDAR systems and 1550-nanometer LiDAR systems. Copper may also be used for a variety of other operational wavelengths, and alternative metals (e.g., gold, silver, aluminum, etc.) and various dielectrics and metal-coated dielectrics are known to be highly reflective at various wavelengths. It is appreciated that some materials, as known in the art, may be preferred for visible wavelengths, other materials may be more suitable for ultraviolet wavelengths, and still other materials may be more suitable for infrared wavelengths.

A specific example of a tunable, optical metasurface is a planar copper reflector covered with silicon dioxide. Between 10,000 and 100,000 copper rails extend from the silicon dioxide-covered copper reflector. The copper rails are subdivided into subsets of copper rails. Each subset of copper rails includes between 100 and 10,000 copper rails. The tunable, optical metasurface may include a number of electrical contacts equal to the number of copper rails in each subset.

For example, each subset may include 1,000 rails, and the tunable, optical metasurface may include 50 subsets for a total of 50,000 metal rails. The tunable, optical metasurface may include 1,000 electrical contacts. Each electrical contact may be connected to one rail within each subset.

Liquid crystal deposited between the metal rails may be secured via an optically transparent cover (e.g., glass). The application of a voltage pattern to the 1,000 electrical contacts via a voltage controller results in a voltage differential bias pattern applied to the liquid crystal that changes the local reflection phase thereof. A beam steering controller selects a voltage pattern corresponding to a reflection phase pattern of a target beam steering angle. By modifying the applied voltage, incident optical radiation can be steered in one direction. Similar embodiments using columns or pillars instead of elongated metal rails may be used to allow for two-dimensional beam steering or spatial beamforming.

Various combinations of the embodiments and features described above may be used to build a solid-state light detection and ranging (LiDAR) transmitter, receiver, or transceiver system. The transceiver system, according to various embodiments, may include a first tunable, optically reflective metasurface for transmitting the light and a second tunable, optically reflective metasurface for receiving light reflected by distant objects (rebounded light). The distance to the distant objects can be calculated by measuring the time-of-flight of the transmitted and rebounded light. Each of the optically reflective metasurfaces includes an optically reflective surface (or reflective layered surface) with an array (e.g., two-dimensional or one-dimensional array) of sub-wavelength, optical resonant antennas. Voltage bias patterns applied to liquid crystal associated with the optical resonant antennas modify the local reflection phases thereof. A controller may selectively apply a voltage pattern to attain a target beam steering angle or beamform.

The LiDAR system may utilize a laser diode light source for transmissions, such as a laser diode emitting optical radiation at standardized wavelengths of 905 nanometers or 1550 nanometers. Various other wavelengths may be utilized with the systems and methods described herein, including visible wavelengths, sub-infrared wavelengths, and infrared wavelengths. The LiDAR system may include a receiver to reflect rebounded optical radiation to a receiving sensor (such as an avalanche photodiode array) from a target steering angle or beam shape (e.g., corresponding to the transmitted steering angle or beam shape).

It is appreciated that the metasurface technologies described herein may incorporate or otherwise leverage prior advancements in surface scattering antennas, such as those described in U.S. Patent Publication No. 2012/0194399, which publication is hereby incorporated by reference in its entirety. Additional elements, applications, and features of surface scattering antennas that feature a reference wave or feed wave are described in U.S. Patent Publication Nos. 2014/0266946, 2015/0318618, 2015/0318620, 2015/0380828, 2015/0162658, and 2015/0372389, each of which is hereby incorporated by reference in its entirety. Specific descriptions of optical resonant antenna configurations and feature sizes are described in U.S. patent application Ser. Nos. 15/900,676, 15/900,683, and 15/924,744, each of which is hereby incorporated by reference in its entirety.

Throughout this disclosure, examples of transmitting (or receiving) embodiments are provided with the understanding that reciprocal receiving (or transmitting) embodiments are also contemplated. Similarly, it is understood that a system may operate as only a transmitter, only a receiver, simultaneously as a transmitter and receiver, with a time-multiplexed transmitter/receiver, and/or with the first metasurface acting as a transmitter and a second metasurface acting as a receiver.

Many prior advancements in surface scattering antennas have focused on relatively low frequencies (e.g., microwave and RF bands). The presently described embodiments support optical bandwidths and are therefore suitable for LiDAR and other optical-based sensing systems. Specifically, the systems and methods described herein operate in the sub-infrared, mid-infrared, high-infrared, and/or visible-frequency ranges (generally referred to herein as "optical"). Given the feature sizes needed for sub-wavelength optical resonant antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), a programmable logic device (PLD), field-programmable gate array (FPGA), or another customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1A illustrates a representation of a tunable, optical metasurface 100, according to one embodiment. In the illustrated embodiment, the optical metasurface includes optical resonant antennas 150 configured as elongated rails arranged in a one-dimensional array. The block diagram 150' provides a conceptual illustration of the optical resonant antennas 150 as resonators tuned to a particular optical frequency or range of optical frequencies. The elongated rails may be connected to a programmable logic controller, CPU, microcontroller, or another controller to selectively apply tuning signals to modify the resonance of the optical resonant antennas 150. Each control pin 120 may allow for a tuning signal to control the resonance of one or more of the optical resonant antennas, as described in detail according to various embodiments herein.

FIG. 1B illustrates incident optical radiation 125 on the metasurface 100 of FIG. 1A at an angle of incidence. The illustrated angle of incidence is approximately 45 degrees. The incident optical radiation is shown as incident on the conceptual block diagram 150', but it is appreciated that the optical radiation would actually be incident on the optical resonant antennas 150 of the metasurface 100. However, the illustrated tuning forks in the conceptual block diagram 150' provide a visualization of the functionality of the metasurface 100.

Figure 1C:
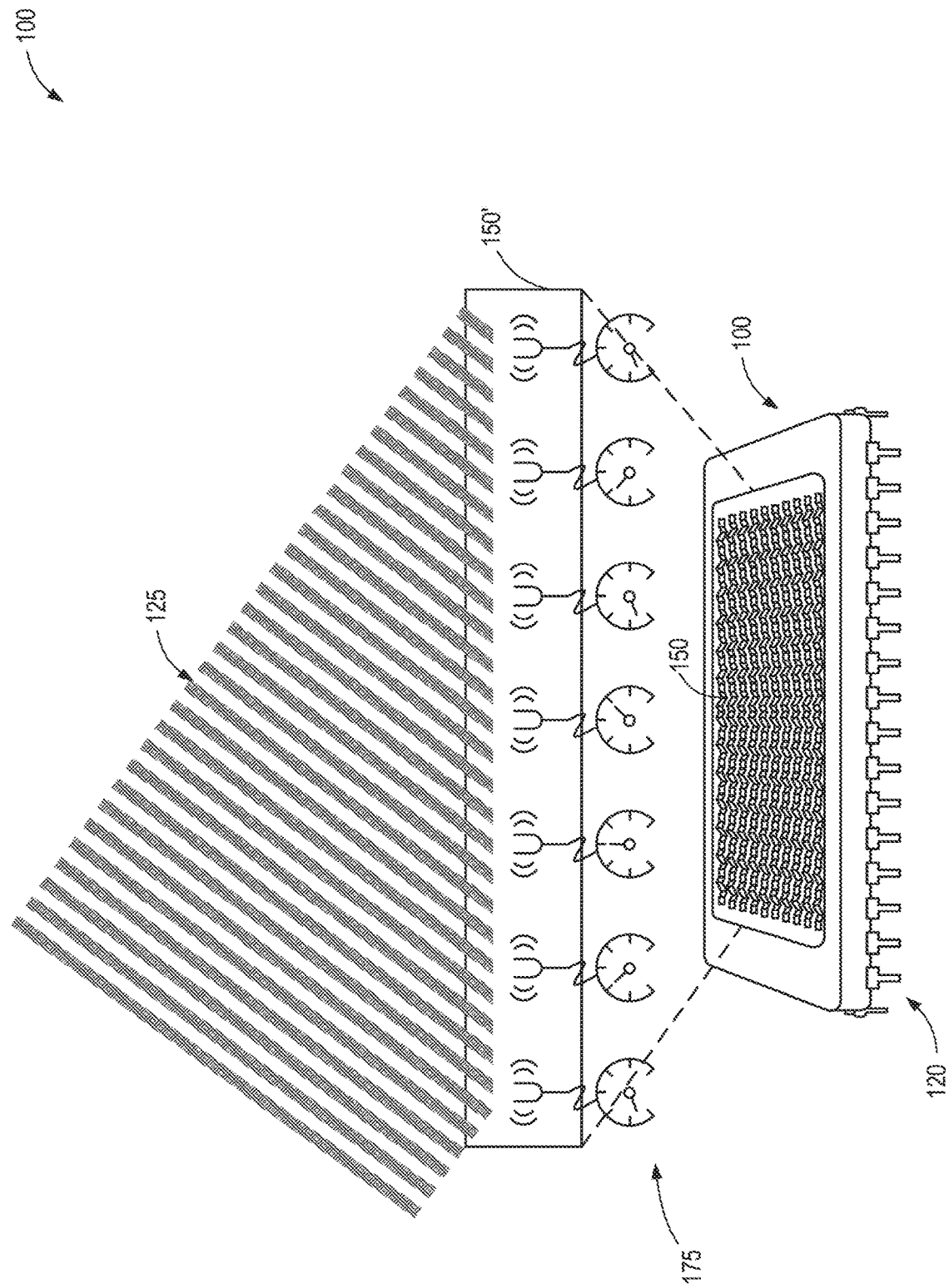
FIG. 1C illustrates an applied voltage differential bias pattern to steer the reflected optical radiation at a first steering angle.

FIG. 1C illustrates an applied voltage differential bias pattern 175 applied to the tuning forks of the functional block diagram 150' to steer the reflection of the incident optical radiation 125 at a first steering angle. As illustrated, different voltage differentials 175 may be applied to different tuning forks of the conceptional block diagram 150'. In various embodiments, each tuning fork may represent a plurality of adjacent or non-adjacent optical resonant antennas. As previously described, each unique voltage differential bias pattern 175 may correspond to a different radiation pattern (e.g., beam steering, beam shape, amplitude, phase delay, etc.).

Figure 1D:
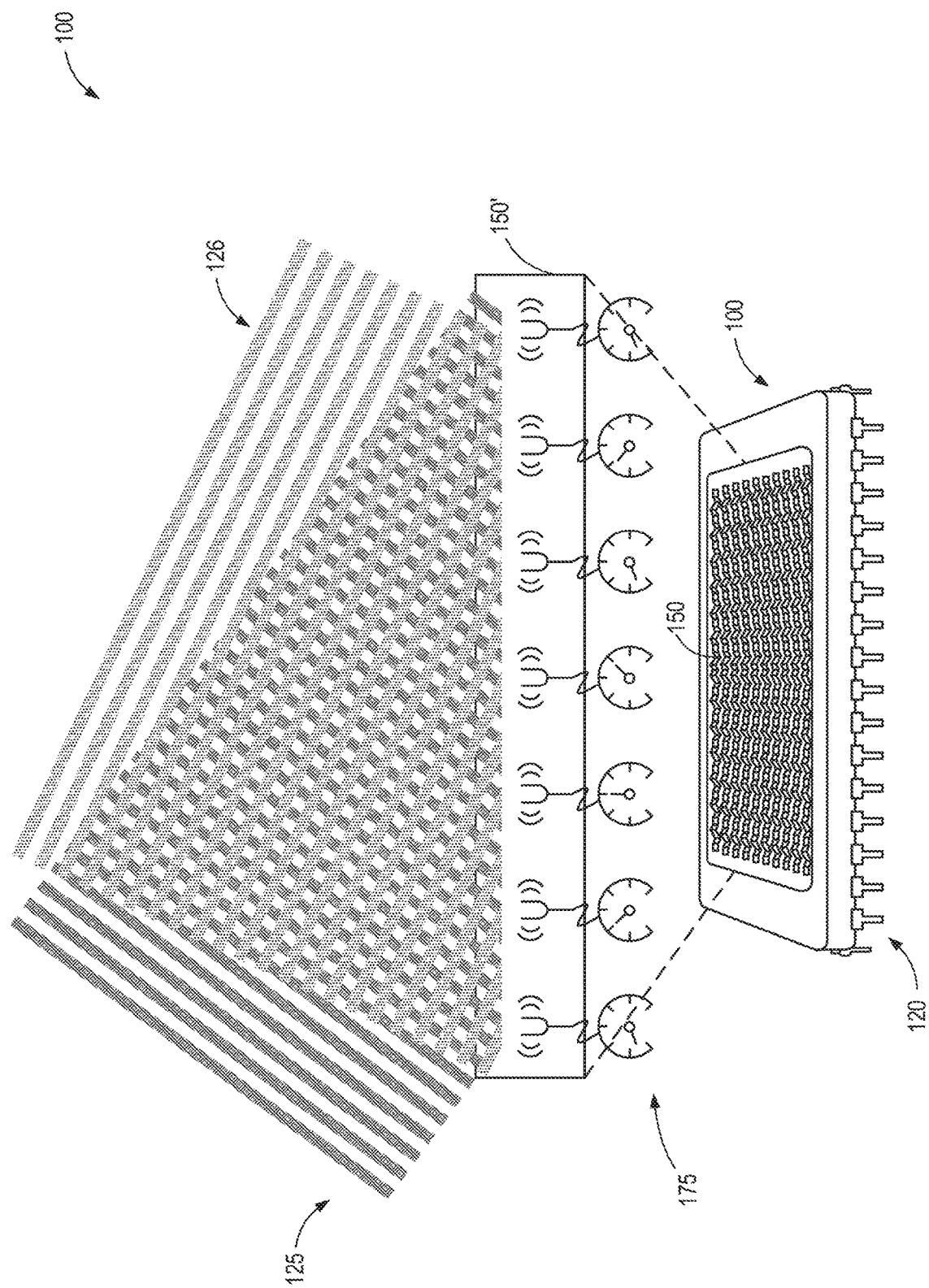
FIG. 1D illustrates the optical radiation reflected at the first steering angle shown as less than 90 degrees relative to the angle of incidence.

FIG. 1D illustrates incident optical radiation 125 reflected as "reflected optical radiation" 126 at an acute angle (i.e., the steering angle is shown as less than 90 degrees relative to the angle of incidence). Modifying the voltages 175 applied to the optical resonant antennas 150 changes the voltage differentials affecting the liquid crystal associated therewith. Each different voltage differential modifies the index of refraction of the liquid crystal and corresponds to a different reflection phase. In a one-dimensional array of elongated rail-type optical resonant antennas 150, as illustrated, each different pattern of reflection phases results in a different beam steering angle.

Figure 2A:
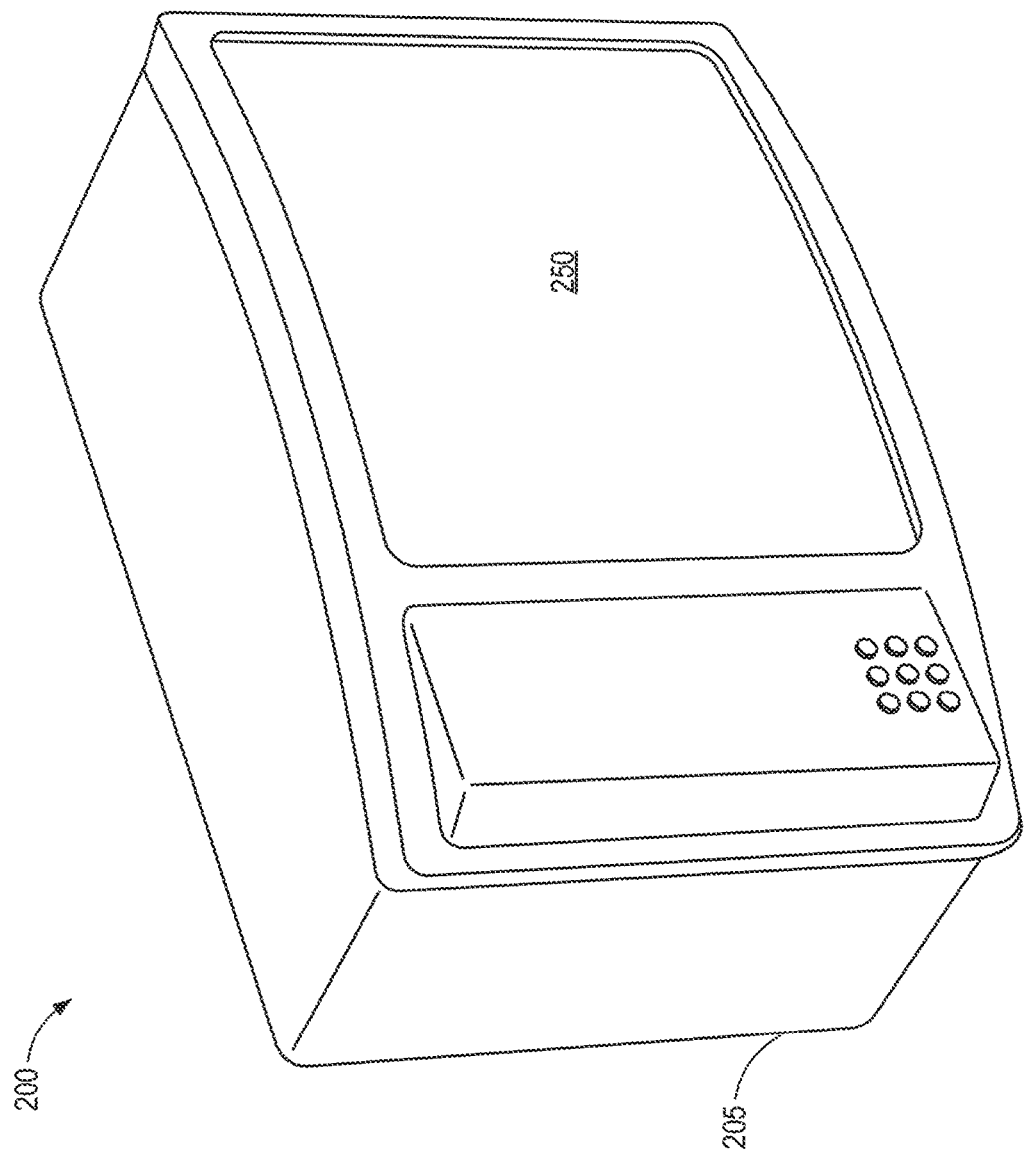
FIG. 2A illustrates an example of a solid-state LiDAR system, according to one embodiment.

FIG. 2A illustrates an example of a solid-state LiDAR system 200, according to one embodiment. The illustrated enclosure 205 is merely an example, and any number of alternative shapes, sizes, styles, etc. are possible. At least one window portion 250 of the enclosure 205 may be optically transparent at the operational wavelengths. In some embodiments, the window portion 250 may be uncovered to allow all optical radiation to enter the enclosure 205. In still other embodiments, the window portion 250 may comprise a filter to filter some or all electromagnetic radiation that is not within an operational bandwidth (and, optionally, harmonics thereof).

Figure 2B:
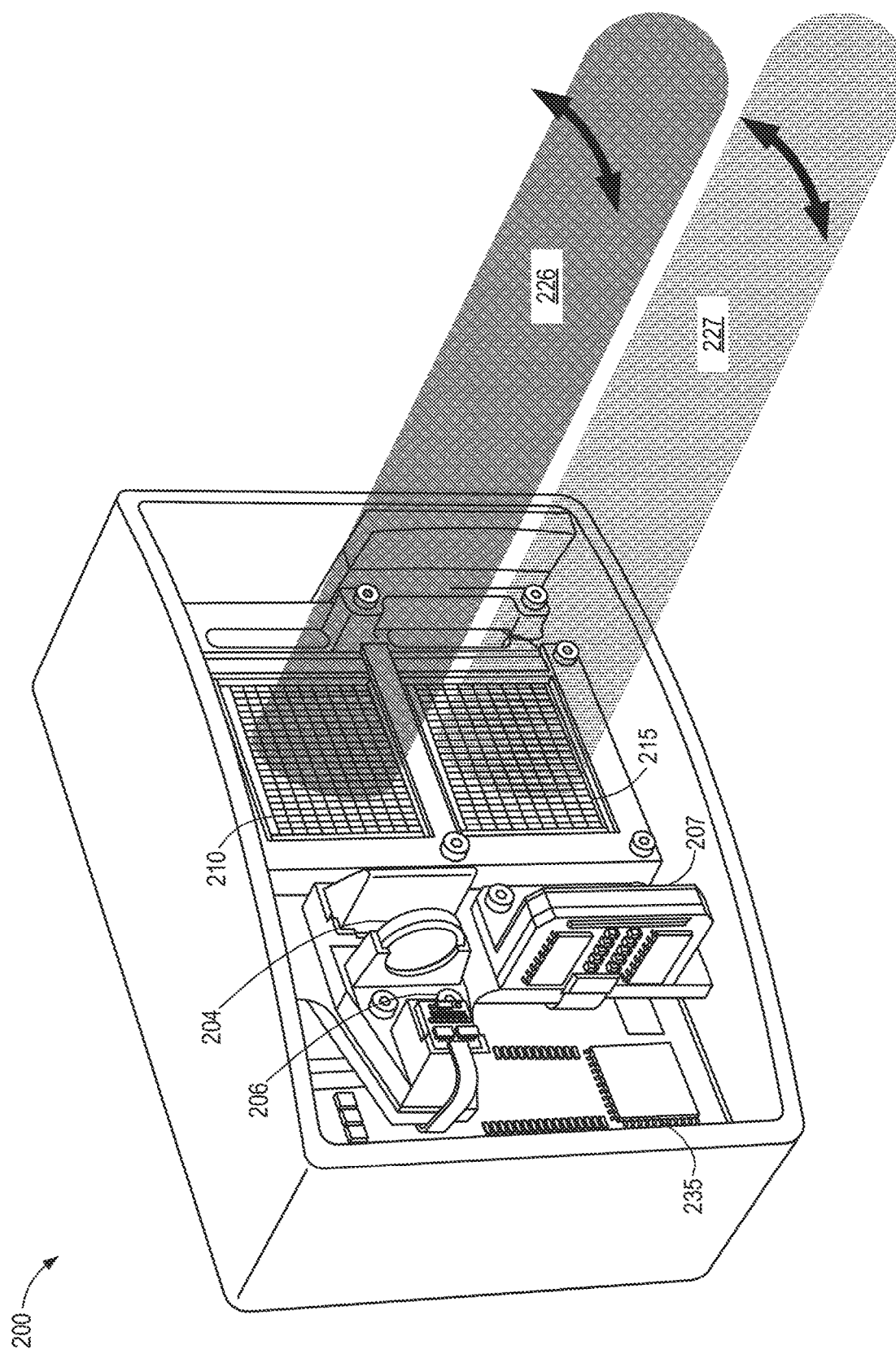
FIG. 2B illustrates a transmit metasurface and a receive metasurface of the solid-state LiDAR system of FIG. 2A with one-dimensional beam steering.

FIG. 2B illustrates a transmit metasurface 210 and a receive metasurface 215 of the solid-state LiDAR system 200 of FIG. 2A with one-dimensional beam steering. A laser diode 206 (e.g., a 905-nanometer laser diode or a 1550-nanometer laser diode) illuminates the transmit metasurface 210 via collimating/focusing optic 204 with optical radiation (not shown for clarity). The optical radiation incident on the transmit metasurface is reflected from the transmit metasurface as transmitted optical radiation 226. Control circuitry (e.g., microchip 235) tunes optical resonant antennas of the transmit metasurface 210 by applying a voltage differential bias pattern to liquid crystal associated therewith to select a reflection phase pattern corresponding to a target beam steering angle of the reflected optical radiation 226.

Control circuitry 235 also tunes the optical resonant antennas of the receive metasurface 215 by applying a corresponding voltage differential bias pattern to select a reflection phase pattern corresponding to the same target beam steering angle. Transmitted optical radiation 226 rebounds off distant objects and is received as rebounded optical radiation 227 by the receive metasurface 215. Optical radiation 227 received by the receive metasurface 215 is reflected by the metasurface at the target beam steering angle to the receive sensor 207. The receive metasurface 215 may reflect the optical radiation through a spherical lens (not shown) to the receive sensor 207. The receive sensor 207 may be a photodiode array, such as an array of avalanche photodiodes (APDs) or an array of single-photon avalanche diodes (SPADs).

Figure 2C:
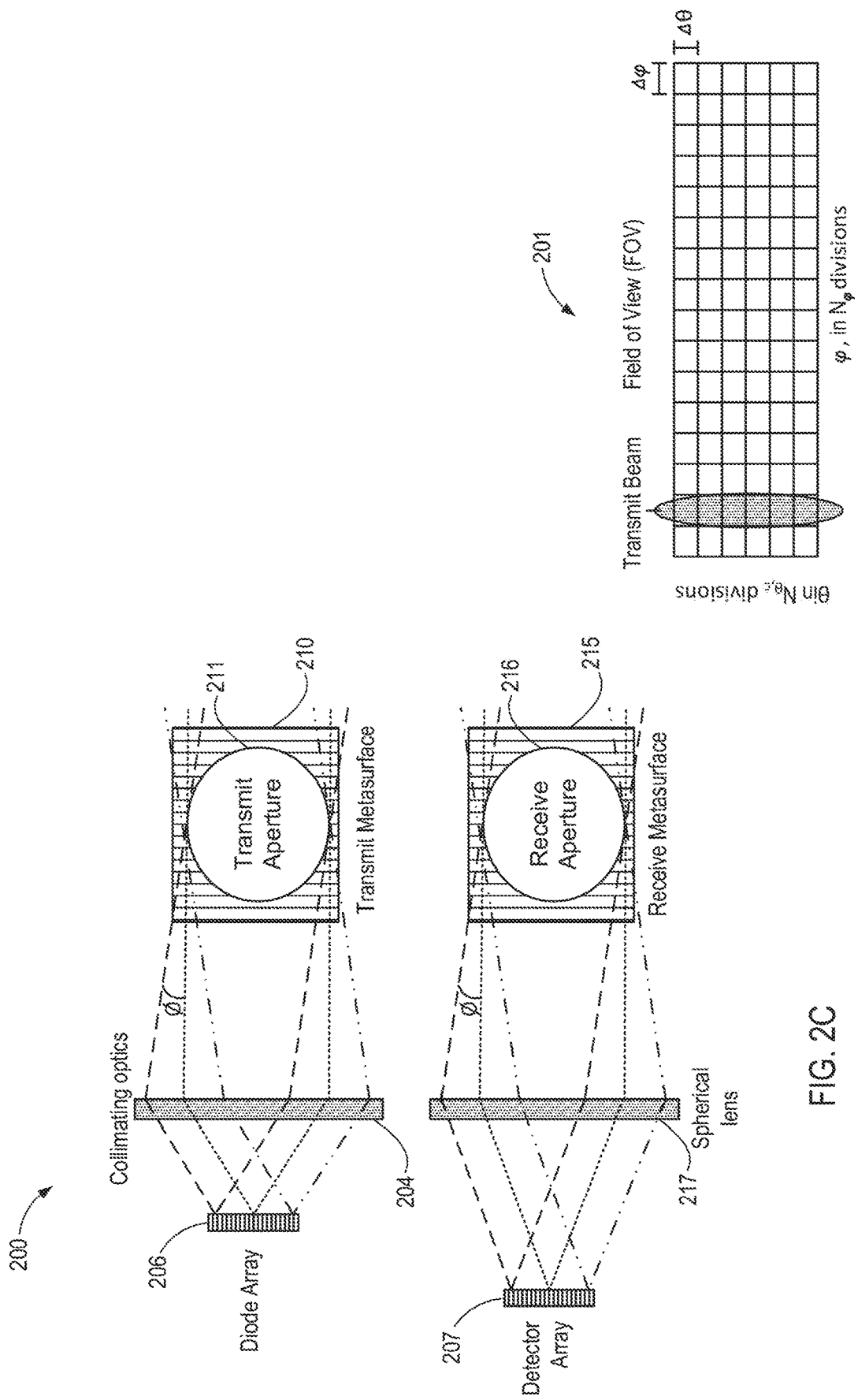
FIG. 2C illustrates a top view of an example optical path of the solid-state LiDAR system.

FIG. 2C illustrates a top view of an example optical path of the solid-state LiDAR system 200 of FIGS. 2A and 2B. One or more optical sources (e.g., an array of diodes 206, as illustrated) transmits optical radiation through collimating optics 204 to the transmit metasurface 210. Specifically, the optical radiation from the array of diodes 206 is collimated by collimating optics 204 to a transmit aperture region 211 on the transmit metasurface 210.

The transmitted optical radiation rebounds off one or more distant objects and is received as rebounded optical radiation by the receive metasurface 215. Optical radiation is reflected by a receive aperture region 216 of the receive metasurface 215 through a spherical lens 217 to be received by the receive sensor 207. FIG. 2C also includes a graphical diagram 201 of the field of the transmit beam relative to the entire field of view (FOV) provided by the illustrated optical path.

Figure 2D:
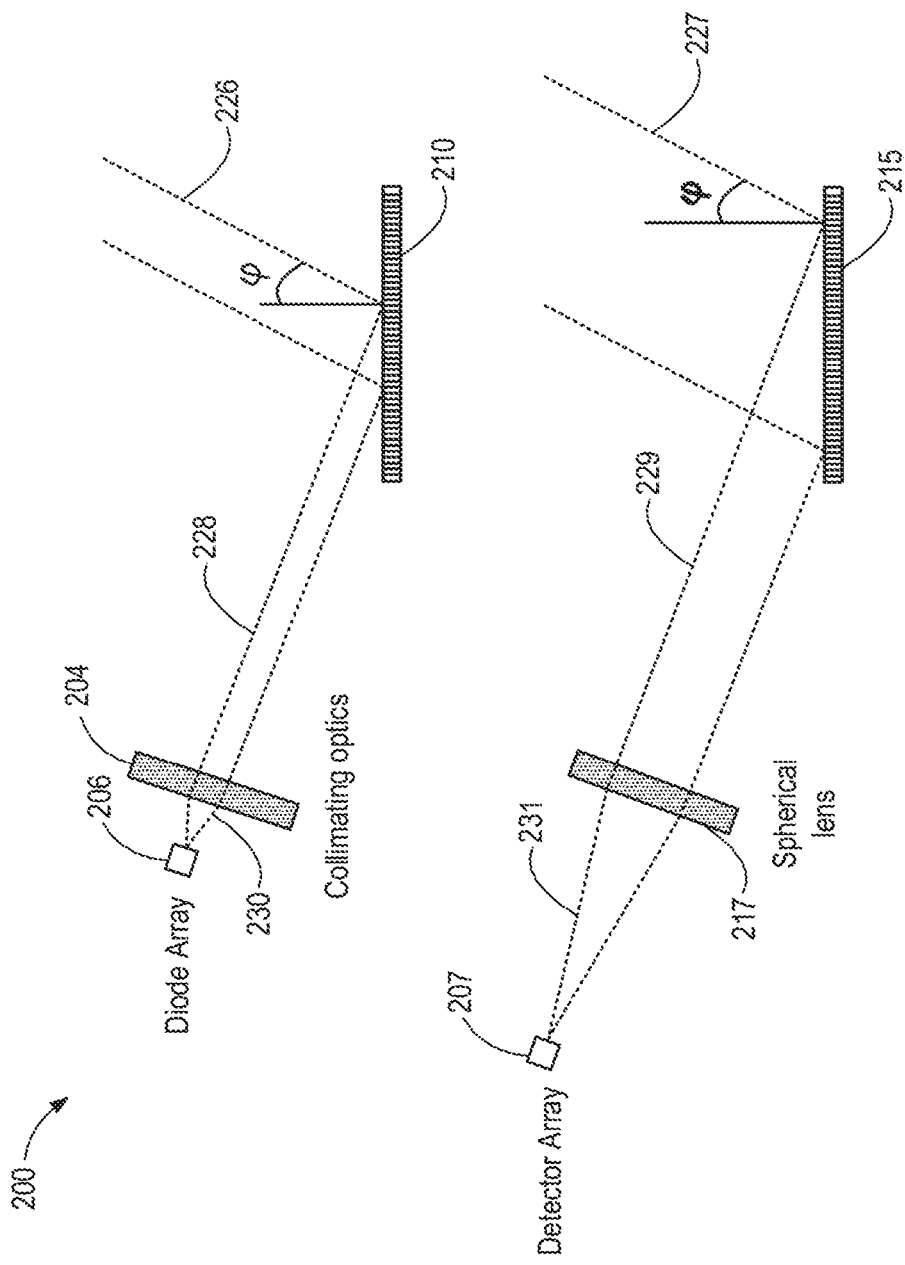
FIG. 2D illustrates a side view of the optical path of the solid-state LiDAR system, according to one embodiment.

FIG. 2D illustrates a side view of the optical path of the solid-state LiDAR system 200, according to one embodiment. As previously described, one or more diodes (such as laser diode 206) generate optical radiation 230 that passes through collimating optics 204 as collimated optical radiation 228. The collimated optical radiation is reflected by the transmit metasurface 210 as transmitted optical radiation 226. The transmitted optical radiation rebounds off one or more distant objects and returns as rebounded optical radiation 227. The rebounded optical radiation 227 is reflected by receive metasurface 215 as reflected optical radiation 229 and refracted by spherical lens 217. The refracted optical radiation 231 is received by the receive sensor 207.

FIG. 3 illustrates an example of an optically reflective metasurface 300 with a reflective surface 301, such as a metal reflector or a dielectric reflector. The reflective surface 301 has an insulating layer 305 to provide electrical insulation from the metal rail optical resonant antennas 375. Each of the optical resonant antennas 375 has an electrically insulating layer 380. The electrically insulating layer 380 may also cove the tops of each of the metal rail optical resonant antennas 375.

Figure 4A:
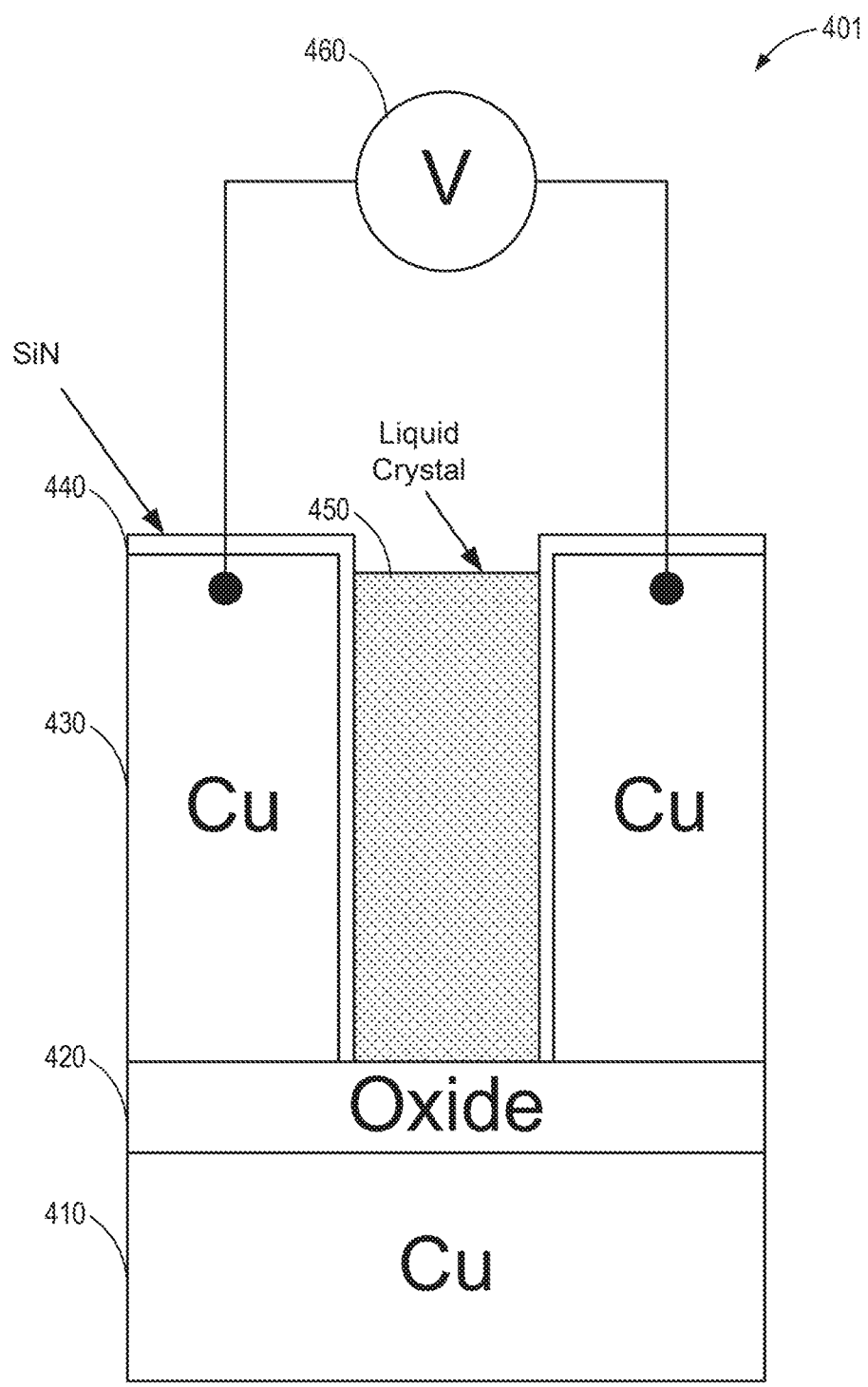
FIG. 4A illustrates an optically reflective copper surface covered with an insulating layer and metal rails extending therefrom with liquid crystal therebetween, according to one embodiment.

FIG. 4A illustrates a specific embodiment of a tunable optical resonant antenna 401 extending from an optically reflective surface 410. Copper antenna rails 430 extend vertically from the optically reflective surface 410 but are electrically insulated therefrom by a layer of oxide or other dielectric material 420. An insulating layer 440 (e.g., silicon nitride or another electrically insulating layer) covers each of the copper antenna rails 430. Liquid crystal 450 is deposited within a gap between adjacent copper antenna rails 430. A voltage controller 460 applies a voltage to the copper antenna rails 430. The reflection phase associated with the liquid crystal 450 is tunable based on the voltage differential between the copper antenna rails 430 generated by the voltage controller 460.

Figure 4B:
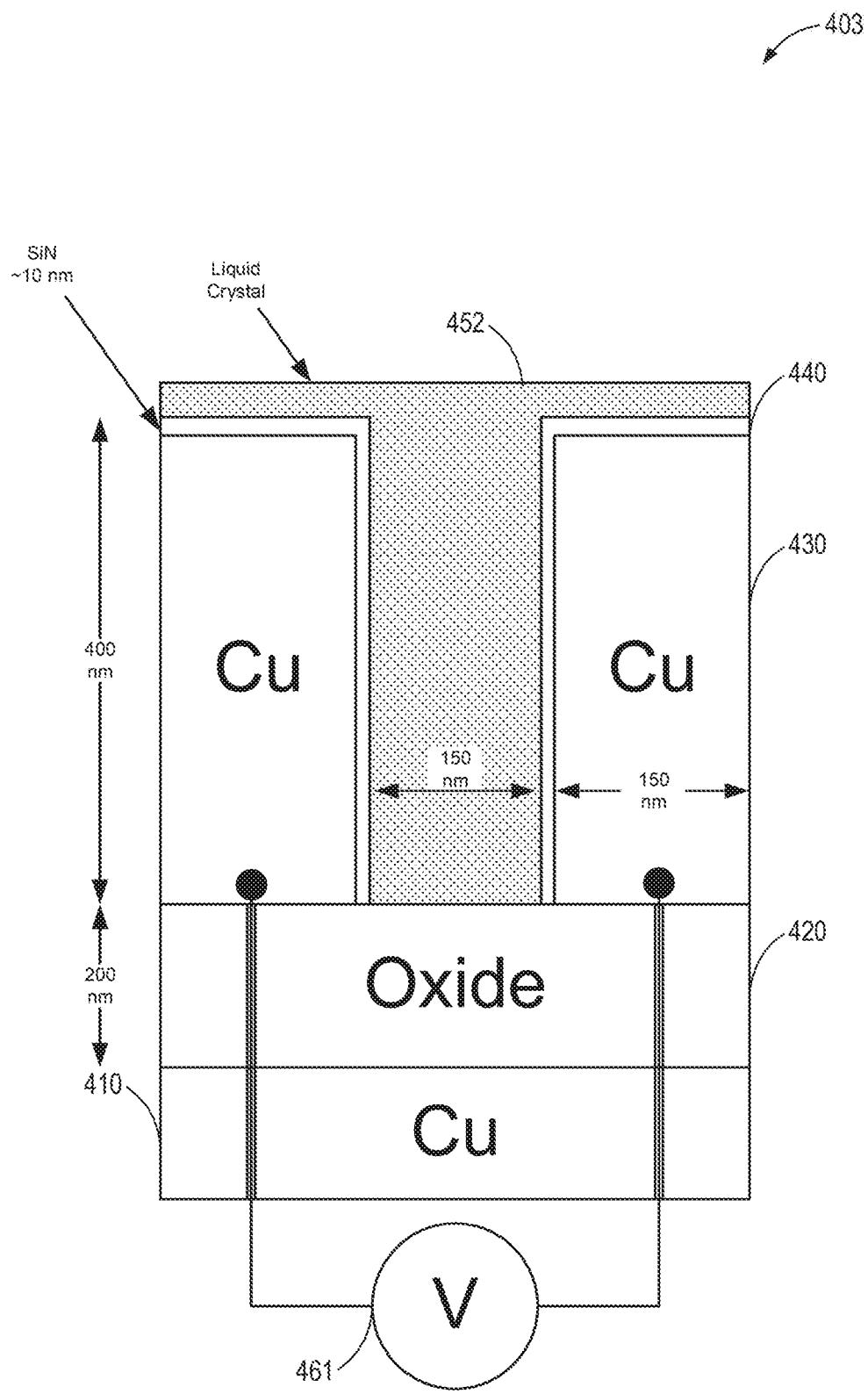
FIG. 4B illustrates an optically reflective copper surface covered with an insulating layer and metal rails extending therefrom with a layer of liquid crystal applied thereto, according to yet another embodiment.

FIG. 4B illustrates another example of a tunable optical resonant antenna 403 with example dimensions, according to one embodiment. A voltage controller 461 is in electrical contact with the copper antenna rails 430 via insulated through-bores in the optically reflective surface 410 and oxide layer 420. A layer of liquid crystal 452 covers the insulator 440 on the copper antenna rails 430 and fills the gap therebetween. The insulator 440 may, for example, comprise silicon nitride, an oxide, or another electrical insulator.

Figure 4C:
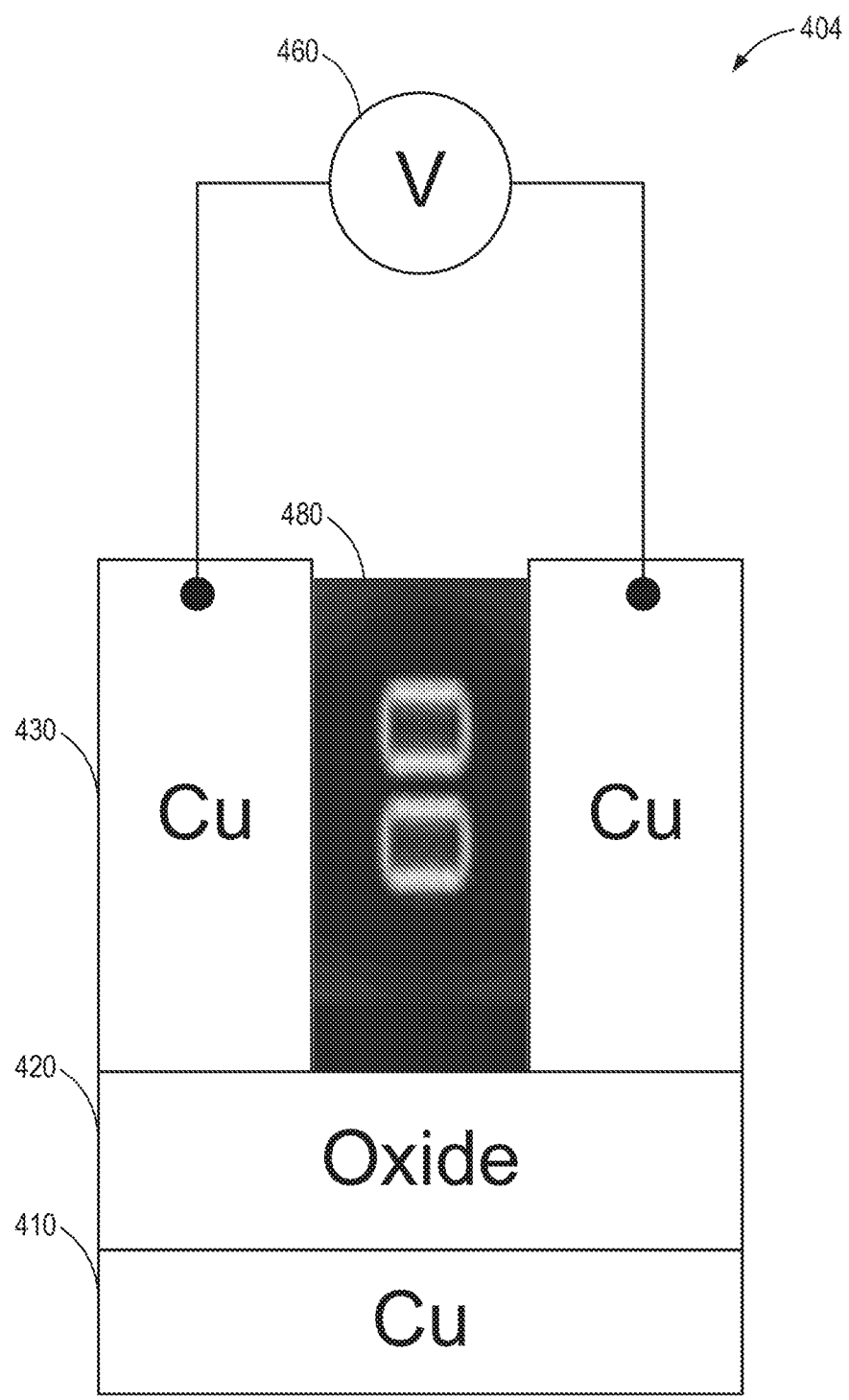
FIG. 4C illustrates an optical field region associated with adjacent metal rails extending from the optically reflective copper surface, according to one embodiment.

FIG. 4C illustrates optical field region 480 associated with adjacent metal rails 430 extending from the oxide layer 420 on the optically reflective surface 410, according to one embodiment. An electric field applied by the voltage controller 460 tunes the optical resonant antenna 404 by modifying the index of refraction of liquid crystal applied on, around, or between the resonant metal rails 430.

Figure 5:
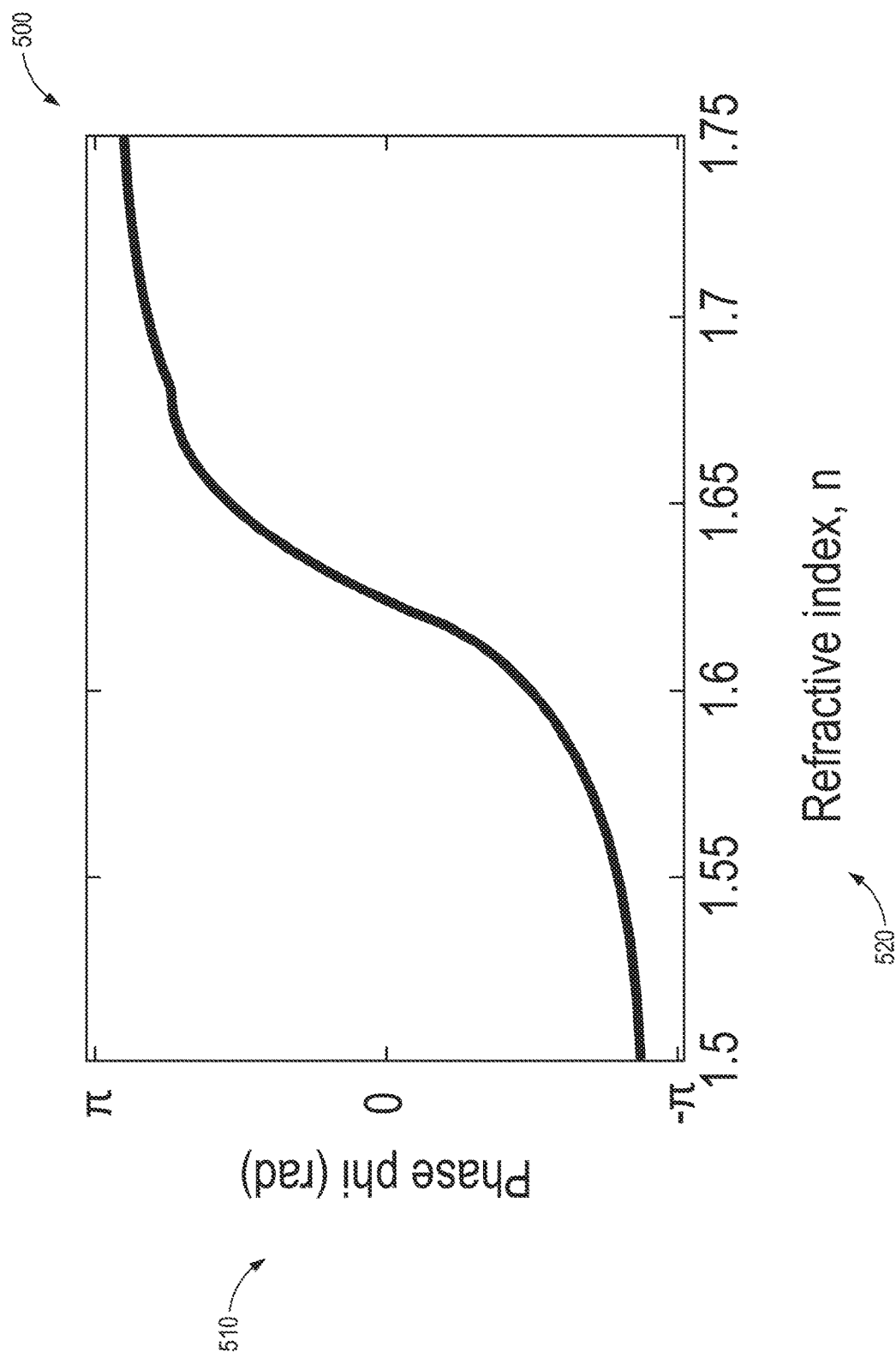
FIG. 5 illustrates the voltage-controlled refractive index of the liquid crystal and corresponding reflection phase, according to one embodiment.

FIG. 5 illustrates a graph 500 of a voltage-controlled refractive index of the liquid crystal 520 and corresponding reflection phase 510, according to one embodiment. The graph 500 shows that the reflection phase can be varied significantly based on the refractive index 520 of the dielectric. As illustrated, a phase modulation of nearly 27 radians is possible with a refractive index modulation of just 0.25. Liquid crystal is a suitable material to provide a variable refractive index 520 and corresponding reflection phase 510 based on a variably controlled voltage differential.

Figure 6:
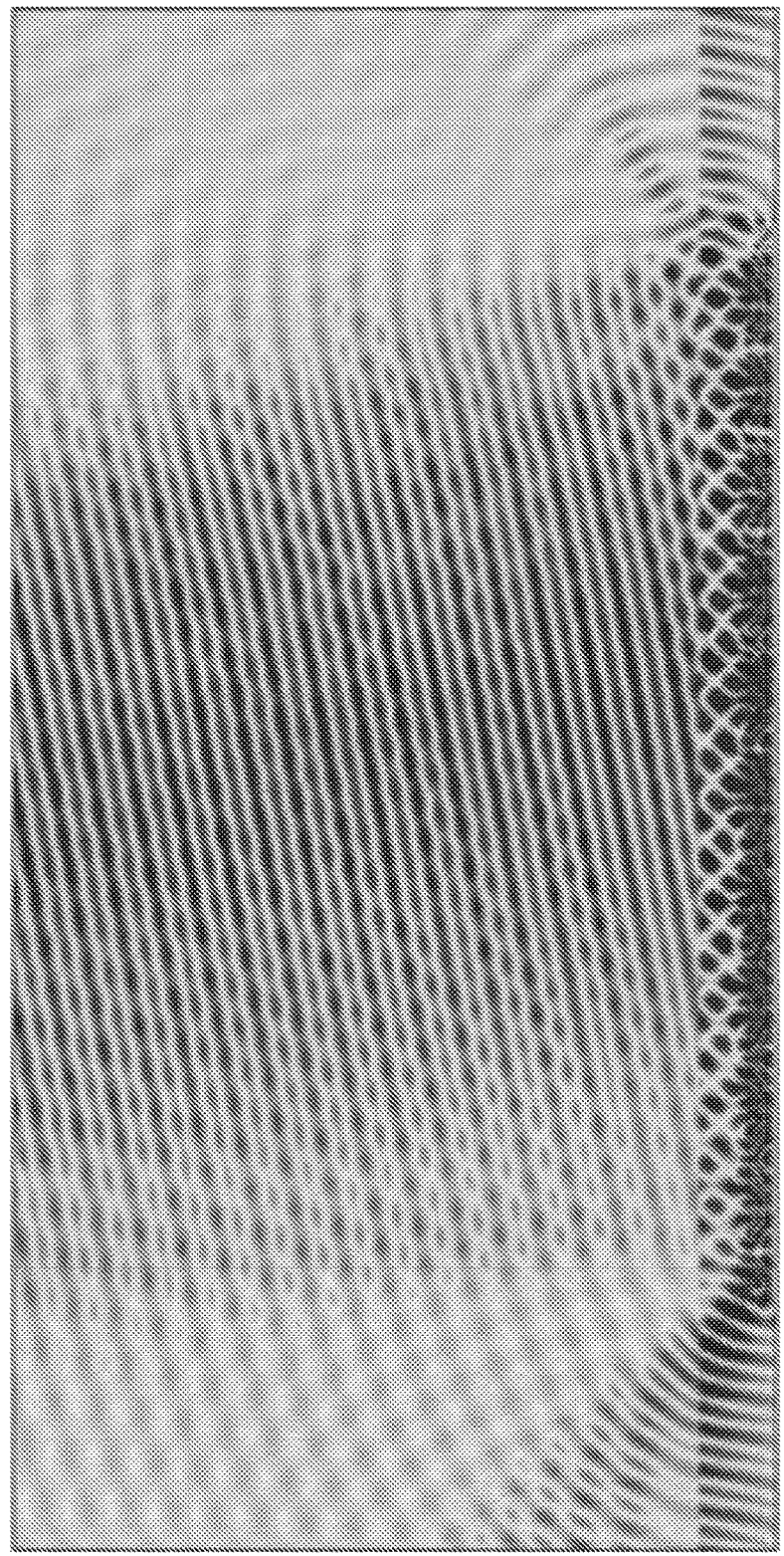
FIG. 6 illustrates a simulation of a beam-steered reflection of optical radiation at a minus 10-degree angle of reflection, according to one embodiment.

FIG. 6 illustrates a simulation 600 of a beam-steering metasurface with optical radiation incident at −70 degrees and reflected at −10 degrees, both measured relative to a vector normal to the metasurface, according to one embodiment.

Figure 7A:
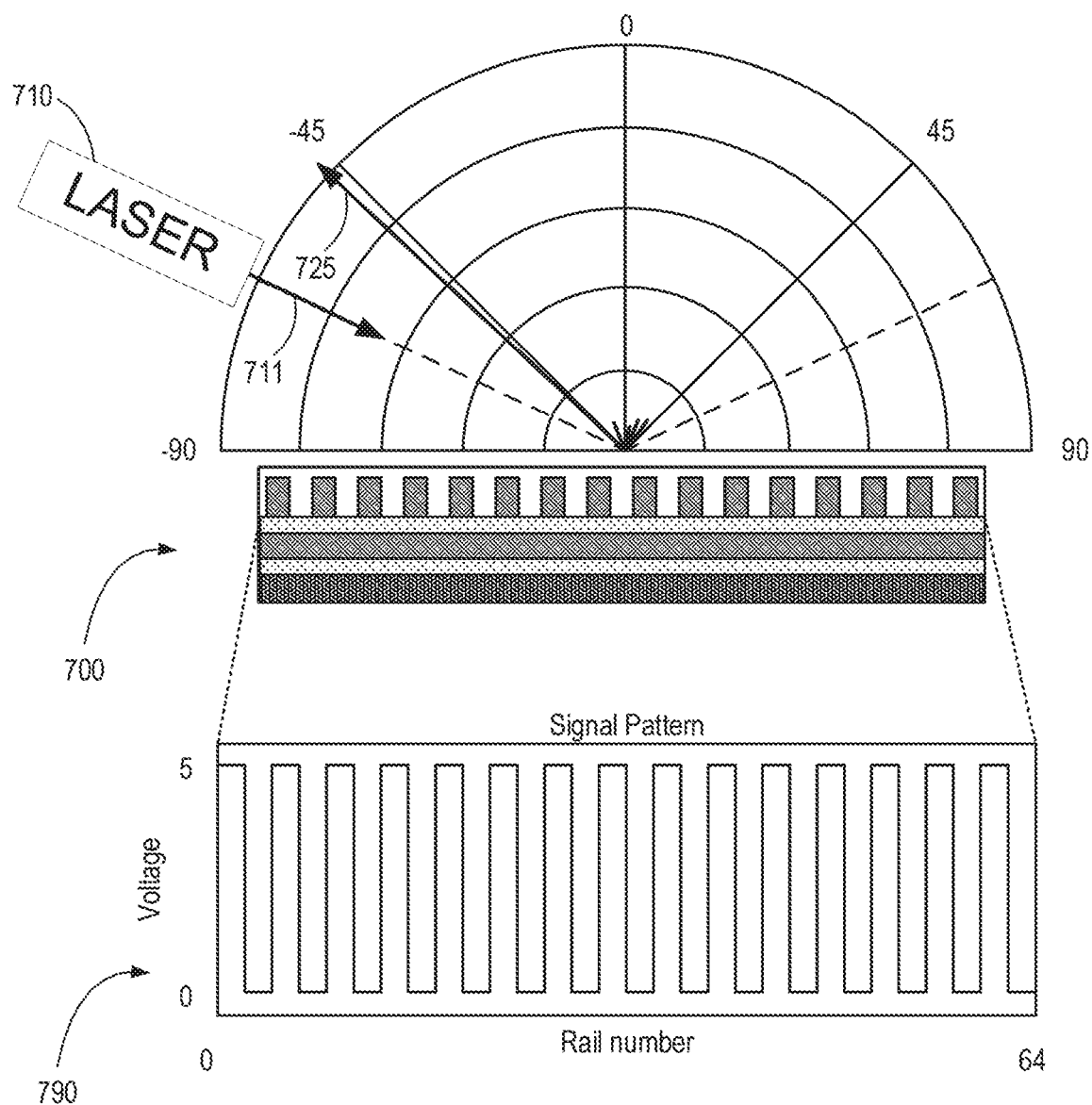
FIG. 7A illustrates a first voltage pattern applied to a one-dimensional array of metal rails to produce a reflected beam at a first steering angle, according to one embodiment.

FIG. 7A illustrates a first voltage pattern 790 applied to a one-dimensional array of metal rails 700. A laser 710 produces incident optical radiation 711 to illuminate the tunable metasurface with the one-dimensional array of metal rails 700. The voltage pattern 790 of high voltage and low voltage may be applied to tune the metasurface to reflect the incident optical radiation 711 as a reflected beam 725 at a first steering angle of approximately −50°.

Figure 7B:
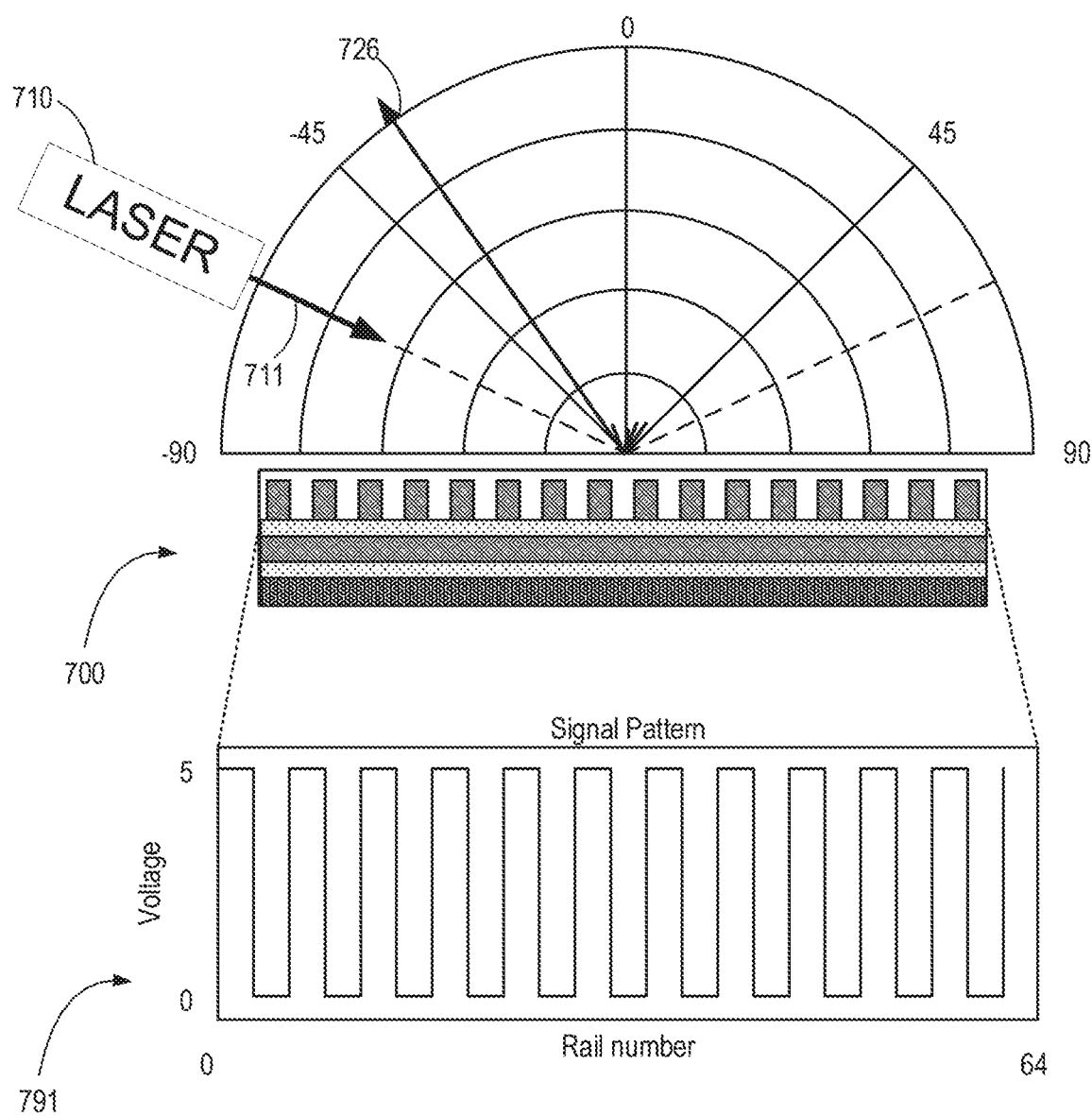
FIG. 7B illustrates a second voltage pattern applied to the one-dimensional array of metal rails to produce a reflected beam at a second steering angle, according to one embodiment.

FIG. 7B illustrates a second voltage pattern 791 applied to the one-dimensional array of metal rails 700 to produce a reflected beam 726 at a second steering angle of approximately −30°.

Figure 7C:
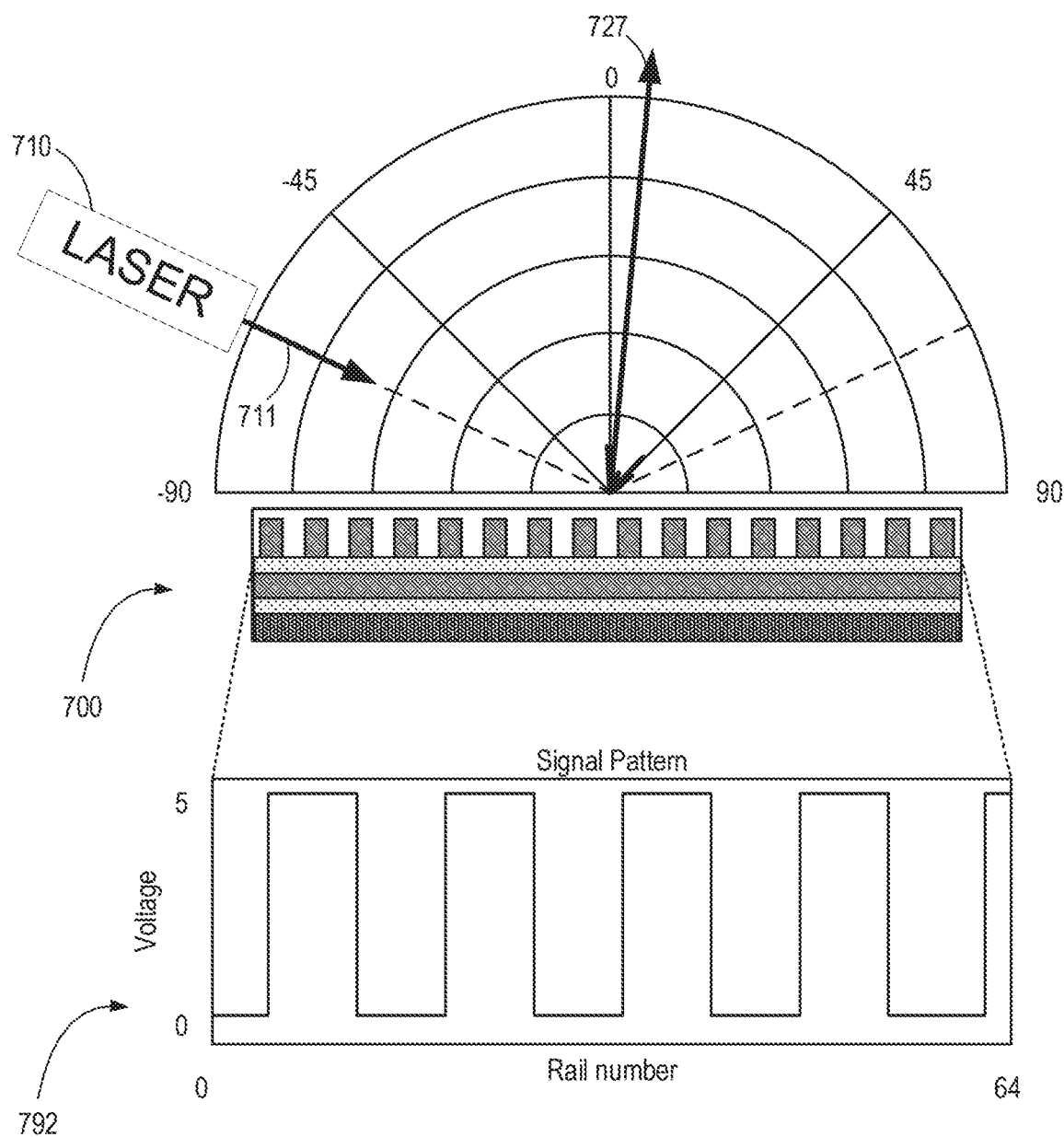
FIG. 7C illustrates a third voltage pattern applied to the one-dimensional array of metal rails to produce a reflected beam at a third steering angle, according to one embodiment.

FIG. 7C illustrates a third voltage pattern 792 applied to the one-dimensional array of metal rails 700 to produce a reflected beam 727 at a third steering angle of approximately 5°, according to one embodiment.

Figure 7D:
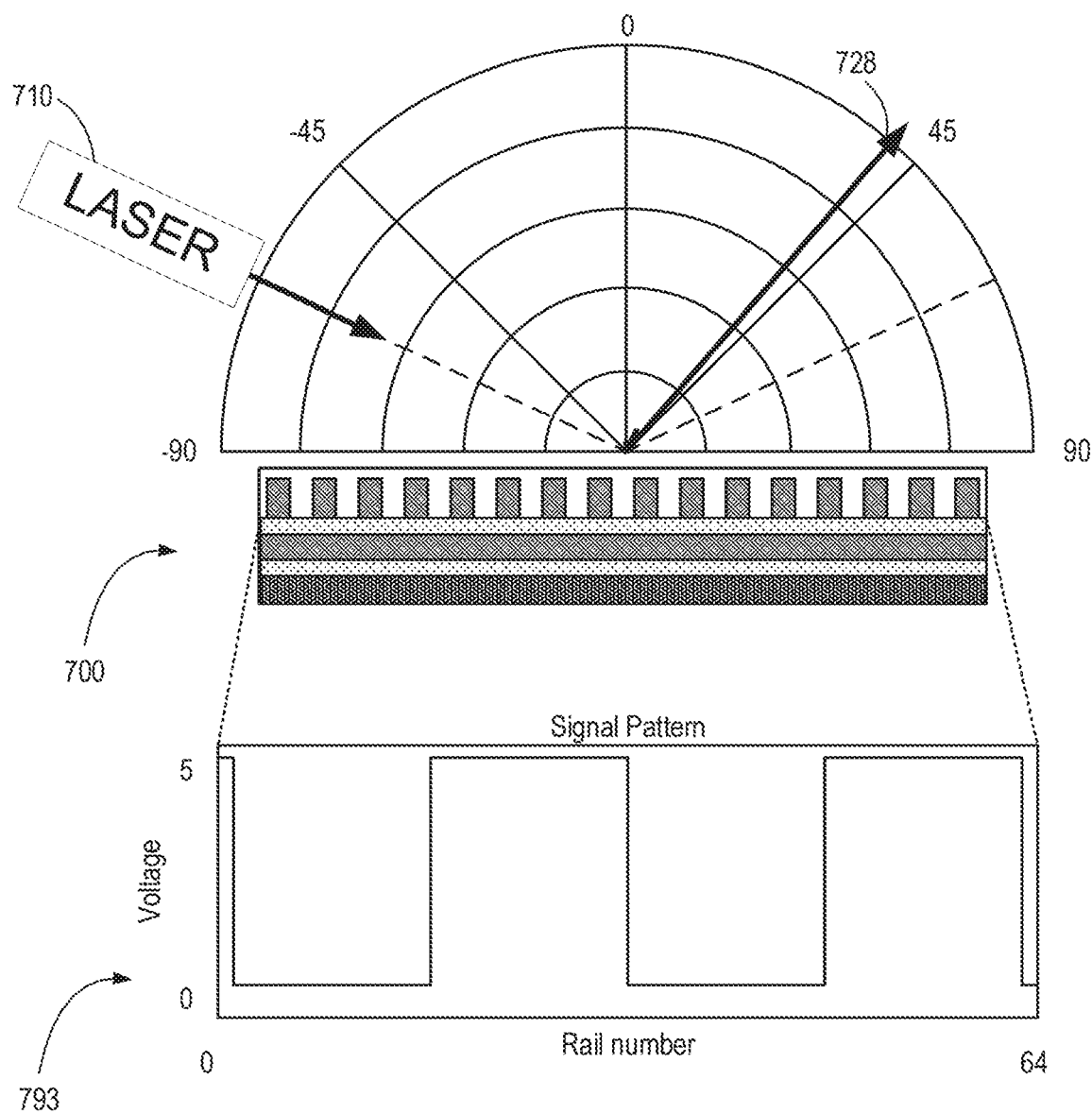
FIG. 7D illustrates a fourth voltage pattern applied to the one-dimensional array of metal rails to produce a reflected beam at a fourth steering angle, according to one embodiment.

FIG. 7D illustrates a fourth voltage pattern 793 applied to the one-dimensional array of metal rails 700 to produce a reflected beam 728 at a fourth steering angle of approximately 40°, according to one embodiment.

Cumulatively, FIGS. 7A-7D illustrate the application of various voltage patterns to attain various target steering angles. It is appreciated that in each illustrated embodiment, the laser 710 can be substituted with an array of sensors (e.g., APDs or SPADs) to receive rebounded optical radiation reflected from a receive metasurface of metal rails 700 at a target steering angle.

Figure 8:
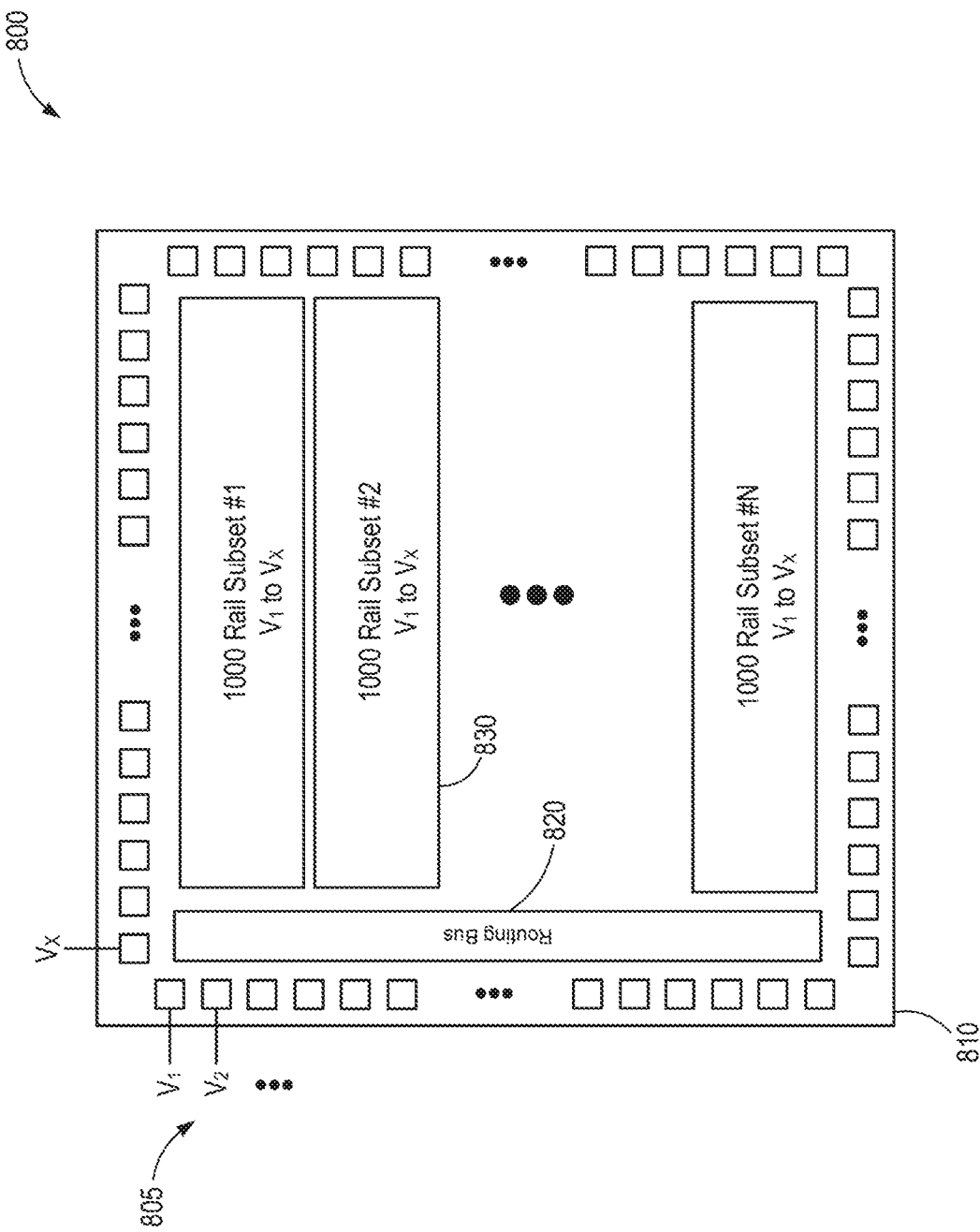
FIG. 8 illustrates a block diagram of an array of optical resonant antenna rails subdivided into subsets of rails that each includes X rails with X corresponding voltage bond pads, according to one embodiment.

FIG. 8 illustrates a block diagram 800 of an array of optical resonant antenna rails subdivided into subsets 830 of X rails with X corresponding voltage bond pads 805 on the chip 810. A routing bus 820 may route contacts 805 between the voltage bond pads and the array(s) of metal rail subsets

830. As an example, 50,000 copper rails may be subdivided into 50 subsets 830 of 1,000 copper rails each. The tunable, optical metasurface may include a number of electrical contacts 805 equal to the number of copper rails in each subset 830. Each electrical contact may be connected to one rail within each subset 830. Accordingly, the reflection phase pattern of each copper rail subset 830 may be the same as the reflection phase pattern of every other copper rail subset 830.

The block diagram 800 of a tunable optical metasurface may be used for spatial beam shaping, two-dimensional beam steering, or one-dimensional beam steering, depending on the configuration of the rails and applied voltage patterns. For example, a one-dimensional array of elongated rails may be used for one-dimensional beam steering. A two-dimensional array of pillars or multiple one-dimensional arrays of elongated rails arranged in a two-dimensional array may be used for two-dimensional beam steering and/or spatial beam shaping.

As in previous embodiments, the optical rail subsets may extend from an optically reflective surface, such as copper. Liquid crystal may be positioned between rails, as a covering on each individual rail, within gaps between adjacent rails, or as a layer covering the rails and gaps therebetween. A wide variety of shapes, sizes, materials, configurations, and the like may be utilized.

Figure 9:
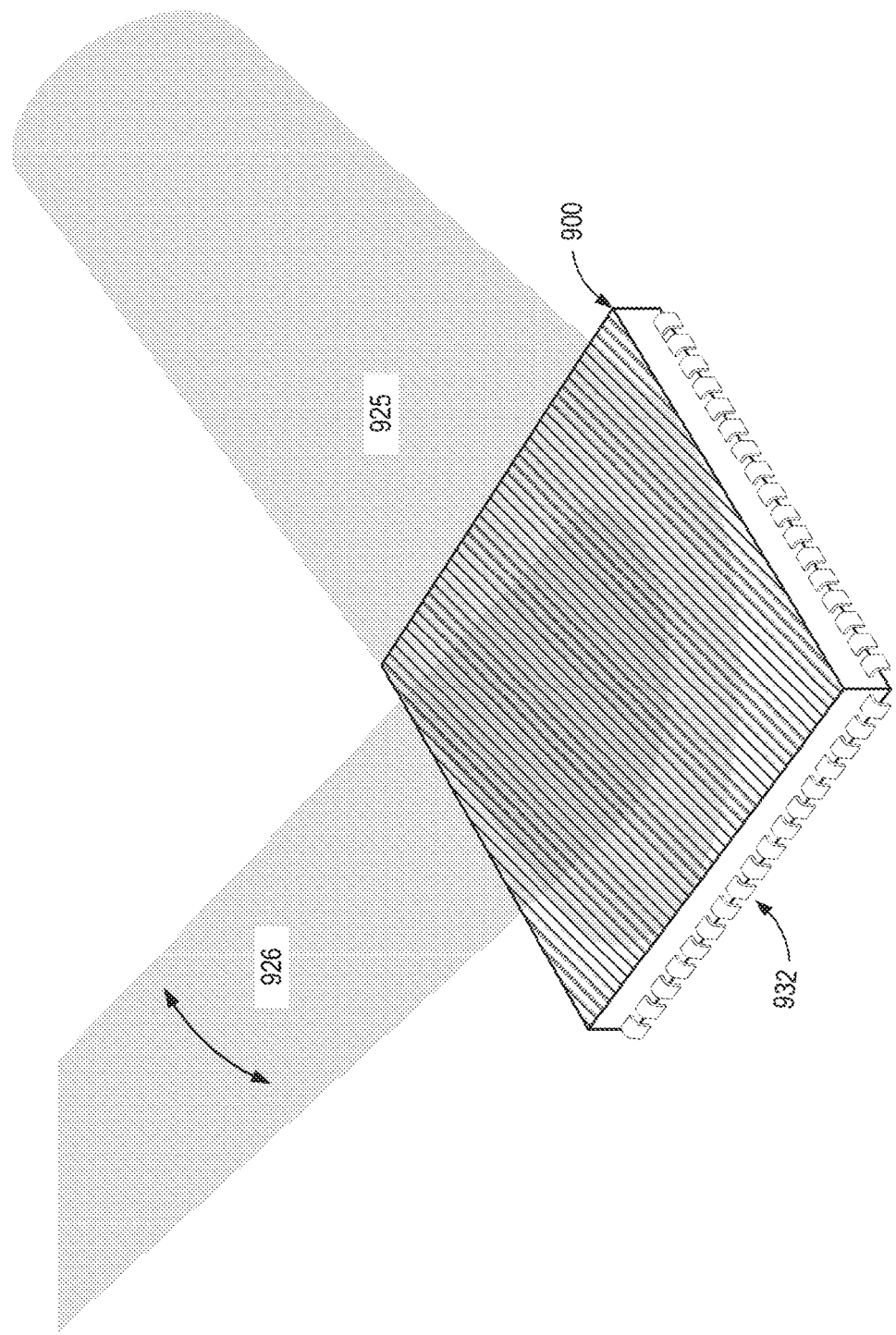
FIG. 9 illustrates an example of a packaged array of optical resonant antennas tunable via a perimeter of voltage contacts, according to one embodiment.

FIG. 9 illustrates an example of a packaged chip 900 with an array of optical resonant antennas tunable via a perimeter of electrical contacts 932, according to one embodiment. Incident optical radiation 925 from a laser diode is reflected as transmitted optical radiation 926 at a target steering angle based on the voltages applied via the electrical contacts 932 (e.g., voltage or current electrical contracts).

Figure 10:
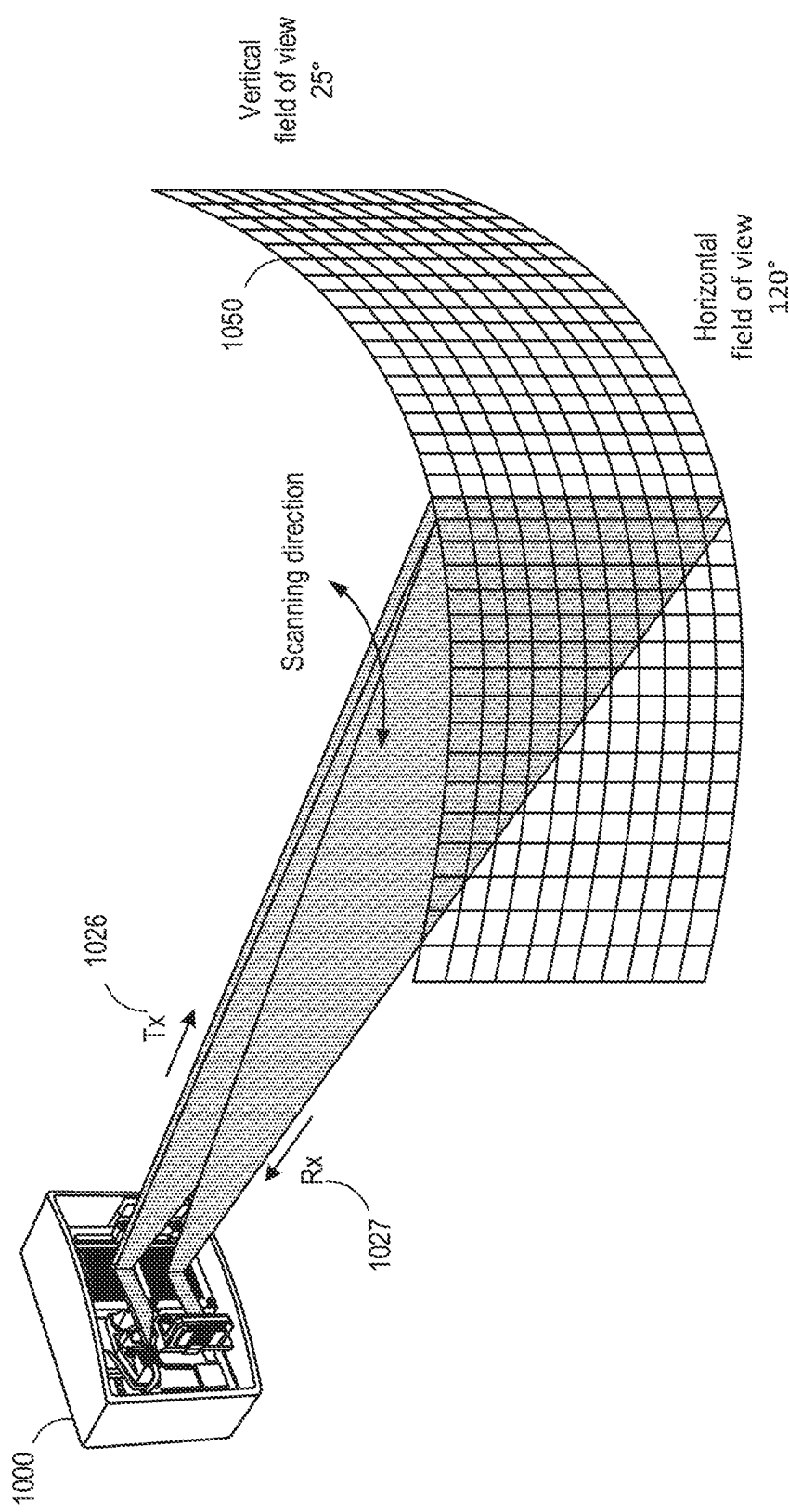
FIG. 10 illustrates an example one-dimensional scan via a solid-state LiDAR system, according to various embodiments.

FIG. 10 illustrates an example one-dimensional scan via a solid-state LiDAR system 1000, according to various embodiments. As illustrated, the solid-state LiDAR system 1000 can implement a one-dimensional scan along a horizontal field of view with a fixed vertical field of view. A transmit metasurface transmits optical radiation 1026 with a fixed vertical view (e.g., illustrated as 25°) at a first horizontal angle (e.g., illustrated as) 120°. The transmitted optical radiation 1026 is rebounded from distant objects, represented by the plane 1050, though it is recognized that the distant objects may be at varying distances from the solid-state LiDAR system 1000 and not necessarily in the same plane.

The distant objects rebound the optical radiation as rebounded optical radiation 1027. A receive metasurface receives the solid-state LiDAR system 1000 at a corresponding horizontal angle and vertical field of view. In various embodiments, and as described herein, the solid-state LiDAR system may scan along the horizontal field of view at various scan angles by modifying the reflection phase patterns of the transmit and receive metasurfaces over a scan time period.

In other embodiments, a LiDAR system may include a tunable transmit metasurface according to any of the embodiments described herein for transmitting beamformed optical radiation. However, instead of using a tunable metasurface to receive rebounded optical radiation, the LiDAR system may include a fixed-focus receiver, a receiver with limited tuning capabilities, and/or one or more omnidirectional receivers. In other embodiments, the LiDAR system may include a tunable receive metasurface according to any of the embodiments described herein, but a more traditional transmitter, such as a fixed-focus transmitter, a limited-focus transmitter, or an omnidirectional transmitter.

In still other embodiments, a system may function as a transmitter only and include a tunable metasurface for transmitting optical radiation, but no corresponding receiver. Similarly, a system may function as a receiver only and include a tunable metasurface for receiving optical radiation, but no corresponding transmitter.

In any of the various embodiments, the optical resonant antennas may be formed as elongated metal rails for one-dimensional beam steering, as illustrated and described. In other embodiments, columns and rows of pillars may be used for two-dimensional beamforming and/or spatial beam shaping. In embodiments for one-dimensional beam steering, each of the optical resonant antennas may comprise a first elongated metal rail that extends up to a height H from the insulator with a defined width W and length L. The proportions of the metal rails may be selected for a particular resonance within an operational wavelength. The elongated metal rails may extend between edges of the underlying reflective surface and may be substantially parallel to one another.

Similarly, in any of the various embodiments, the optical resonant antennas may comprise high-Q adjustable resonant waveguides, such as high-Q adjustable resonant plasmonic waveguides. This high sensitivity to the refractive index of the dielectric is enabled by the high-Q of the resonance (e.g., $Q>=10$). Any of a wide variety of mathematical models for beam steering may be used, including, for example, the Gerchberg-Saxton algorithm.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A solid-state light detection and ranging (LiDAR) transceiver system, comprising:
   a first tunable, optically reflective metasurface to reflect transmitted optical radiation within an operational bandwidth, wherein the first optically reflective metasurface includes:
   a first array of optical resonant antennas arranged at sub-wavelength intervals on a first reflective surface in subset tiles of N optical resonant antennas, where N is an integer, and
   liquid crystal positioned in optical field regions of the optical resonant antennas in the first array;

a light source to transmit optical radiation within the operational bandwidth to the first optically reflective metasurface;

a voltage controller to selectively apply a voltage differential bias pattern of N differential biases to the liquid crystal of each subset tile of N optical resonant antennas in the first array of optical resonant antennas to tunably steer the transmitted optical radiation to a target location;

a second optically reflective metasurface tunable by the voltage controller to receive optical radiation rebounded from the target location, wherein the second optically reflective metasurface comprises a second array of optical resonant antennas arranged at sub-wavelength intervals on a second reflective surface, and liquid crystal positioned in optical field regions of the optical resonant antennas in the second array; and a sensor to receive optical radiation from the second optically reflective metasurface.

2. The transceiver system of claim 1, wherein the light source comprises a diode laser.

3. The transceiver system of claim 1, wherein the sensor comprises an array of avalanche photodiodes (APDs).

4. The transceiver system of claim 1, wherein the sensor comprises an array of single-photon avalanche diodes (SPADs).

5. The transceiver system of claim 1, wherein the voltage controller tunably steers transmitted optical radiation to a target location by modifying the phase of reflected optical radiation associated with each of the optical resonant antennas of the first array.

6. The transceiver system of claim 1, wherein the first and second reflective surfaces comprise portions of a single reflective layer underlying the optical resonant antennas.

7. The transceiver system of claim 1, wherein the optical resonant antennas of each of the first and second arrays comprise metal rails extending from the respective first and second reflective surfaces, wherein the metal rails are spaced from one another to form channels therebetween.

8. The transceiver system of claim 7, wherein each metal rail comprises copper.

9. The transceiver system of claim 7, wherein each metal rail comprises silver.

10. The transceiver system of claim 7, wherein each metal rail comprises gold.

11. The transceiver system of claim 7, wherein each metal rail comprises aluminum.

12. A system, comprising:

a first tunable, optically reflective metasurface to reflect transmitted optical radiation within an operational bandwidth, wherein the first optically reflective metasurface includes:

a first array of optical resonant antennas arranged at sub-wavelength intervals on a first reflective surface in subset tiles of N optical resonant antennas, where N is an integer, and liquid crystal positioned in optical field regions of the optical resonant antennas in the first array;

a light source to transmit optical radiation within the operational bandwidth to the first optically reflective metasurface; and a voltage controller to selectively apply a voltage differential bias pattern of N differential biases to the liquid crystal of each subset tile of N optical resonant antennas in the first array of optical resonant antennas to tunably steer the transmitted optical radiation to a target location.

13. The system of claim 12, wherein the light source comprises a diode laser.

14. The system of claim 12, wherein the voltage controller tunably steers transmitted optical radiation to a target location by modifying the phase of reflected optical radiation associated with each of the optical resonant antennas of the first array.

15. The system of claim 12, wherein the optical resonant antennas of each of the first and second arrays comprise metal rails extending from the respective first and second reflective surfaces, wherein the metal rails are spaced from one another to form channels therebetween, and wherein each of the metal reals comprises one or more of copper, aluminum, gold, and silver.

16. The system of claim 12, wherein the first and second reflective surfaces comprise portions of a single reflective layer underlying the optical resonant antennas.

17. A solid-state light detection and ranging (LiDAR) transmitter, comprising:

a first tunable, optically reflective metasurface to reflect transmitted optical radiation within an operational bandwidth, wherein the first optically reflective metasurface comprises:

a first array of optical resonant antennas formed as a plurality of metal rails extending from the first optically reflective metasurface and arranged at sub-wavelength intervals with respect to a first reflective surface in subset tiles of N optical resonant antennas, where N is an integer, wherein each of the metal rails comprises at least one of copper, aluminum, gold, and silver, and liquid crystal positioned in optical field regions of the optical resonant antennas in the first array;

a light source to transmit optical radiation within the operational bandwidth to the first optically reflective metasurface; and a voltage controller to selectively apply a voltage differential bias pattern of N differential biases to the liquid crystal of each subset tile of N optical resonant antennas in the first array of optical resonant antennas to tunably steer the transmitted optical radiation to a target location.

18. The transmitter of claim 17, wherein the light source comprises a diode laser.

19. The transmitter of claim 17, wherein the voltage controller tunably steers transmitted optical radiation to a target location by modifying the phase of reflected optical radiation associated with each of the optical resonant antennas of the first array.

20. The transmitter of claim 17, wherein the first and second reflective surfaces comprise portions of a single reflective layer underlying the optical resonant antennas.

* * * * *